US008683314B2

(12) United States Patent
Berkner et al.

(10) Patent No.: US 8,683,314 B2
(45) Date of Patent: Mar. 25, 2014

(54) TREE PRUNING OF ICON TREES VIA SUBTREE SELECTION USING TREE FUNCTIONALS

(75) Inventors: Kathrin Berkner, Los Altos, CA (US); Michael Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 1321 days.

(21) Appl. No.: 11/331,481

(22) Filed: Jan. 13, 2006

(65) Prior Publication Data

US 2007/0168856 A1 Jul. 19, 2007

(51) Int. Cl.
*G06F 17/00* (2006.01)

(52) U.S. Cl.
USPC ............................ 715/210; 715/200; 715/229

(58) Field of Classification Search
USPC ................................. 715/210, 229, 237, 200
See application file for complete search history.

(56) References Cited

U.S. PATENT DOCUMENTS

| 5,408,603 | A | * | 4/1995 | Van de Lavoir et al. ...... 715/763 |
| 5,557,728 | A | * | 9/1996 | Garrett et al. ................. 715/801 |
| 5,684,970 | A | * | 11/1997 | Asuma et al. ................. 715/775 |
| 5,745,712 | A | * | 4/1998 | Turpin et al. .................. 715/763 |
| 5,794,178 | A | * | 8/1998 | Caid et al. ........................ 704/9 |
| 5,796,401 | A | * | 8/1998 | Winer ............................ 345/619 |
| 5,895,474 | A | * | 4/1999 | Maarek et al. ................. 715/210 |
| 5,933,823 | A |   | 8/1999 | Cullen et al. |
| 5,973,692 | A | * | 10/1999 | Knowlton et al. ............. 715/835 |
| 5,995,978 | A | * | 11/1999 | Cullen et al. ................ 707/104.1 |
| 5,999,664 | A | * | 12/1999 | Mahoney et al. ............. 382/305 |
| 6,237,006 | B1 | * | 5/2001 | Weinberg et al. .......... 707/103 R |
| 6,300,947 | B1 | * | 10/2001 | Kanevsky ...................... 715/866 |
| 6,304,260 | B1 | * | 10/2001 | Wills ............................. 715/853 |
| 6,456,305 | B1 | * | 9/2002 | Qureshi et al. ................ 715/800 |
| 6,728,752 | B1 | * | 4/2004 | Chen et al. .................... 709/203 |
| 6,754,675 | B2 | * | 6/2004 | Abdel-Mottaleb et al. ........................ 707/104.1 |
| 6,976,226 | B1 | * | 12/2005 | Strong et al. .................. 715/788 |
| 7,146,367 | B2 | * | 12/2006 | Shutt ................................. 707/9 |
| 7,159,193 | B2 | * | 1/2007 | Wada ............................. 715/838 |
| 7,447,999 | B1 | * | 11/2008 | Robertson et al. ............ 715/835 |
| 2001/0014897 | A1 | * | 8/2001 | Hata et al. ..................... 707/506 |
| 2002/0029232 | A1 | * | 3/2002 | Bobrow et al. ................ 707/517 |
| 2002/0175924 | A1 | * | 11/2002 | Yui et al. ....................... 345/660 |
| 2003/0025693 | A1 | * | 2/2003 | Haley ............................ 345/418 |
| 2003/0046167 | A1 | * | 3/2003 | Wada .............................. 705/16 |
| 2004/0145593 | A1 |   | 7/2004 | Berkner et al. |
| 2004/0194026 | A1 | * | 9/2004 | Barrus et al. .................. 715/515 |
| 2005/0028074 | A1 | * | 2/2005 | Harrington et al. ........... 715/500 |
| 2006/0294477 | A1 | * | 12/2006 | Cheng et al. .................. 715/810 |

OTHER PUBLICATIONS

Gersho, A, et al. "Vector Quantization and Signal Compression". Kluwer Academic Press. 1992.

(Continued)

*Primary Examiner* — Stephen Hong
*Assistant Examiner* — Marshon Robinson
(74) *Attorney, Agent, or Firm* — Blakely, Sokoloff, Taylor & Zafman LLP

(57) ABSTRACT

A method and apparatus for creating visualizations using tree functionals is described. In one embodiment, the method comprises representing a group of document images using a plurality of visualizations that visualize document layout information for the group of document images based on one or more display device characteristics and based on content of the group of documents, and adapting the plurality of visualizations to an available display by removing one or more visualizations from the plurality of visualizations based on at least two functional values.

24 Claims, 17 Drawing Sheets

(56) References Cited

OTHER PUBLICATIONS

Hastie, Trevor, et al. "The Elements of Statistical Learning: Data Mining, Inference, and Prediction". Springer Series in Statistics, Springer-Vertag, 2001.

Aiello, et al., "Document Understanding for a Broad Class of Documents," International Journal on Document Analysis and Recognition (IJDAR), vol. 5(1), pp. 1-16, 2002.

Chou, et al., "Optimal Pruning with Applications to Tree-Structured Source Coding and Modeling," IEEE Transactions on Information Theory, vol. 35, No. 2, pp. 229-315, Mar. 1989.

"Convera—RetrievalWare Categorization and Dynamic Classification," <http://web.archive.org/web/20050404103650/http://www.convera.com/Products/rw_categorization.asp>, 2004, accessed Jun. 6, 2011, 2 pages.

Ding, C.H.Q, et al., "A Min-max Cut Algorithm for Graph Partitioning and Data Clustering," Proc. of the 2001 IEEE Int'l Conference on Data Mining (ICDM'01), San Jose, CA, 2001.

Duda, R.O., Hart, P. E., "Pattern Classification and Scene Analysis," Wiley, New York, 1973.

Kummamuru, K., et al., "A Hierarchical Monothetic Document Clustering Algorithm for Summarization and Browsing Search Results," Proceedings of the 13th international conference on World Wide Web, New York, NY, USA, pp. 658-665, 2004.

Lam, et al, "Summary Thumbnails: Readable Overviews for Small Screen Web Browsers," Proceedings of CHI 2005, Portland, OR, Apr. 2005, pp. 681-690.

Leouski, A., Allan, J., "Visual Interactions with a Multidimensional Ranked List," Proc. of the 21st Annual International ACM SIGIR Conference on Research and Development in Information Retrieval, pp. 353-354, 1998.

Liere, R., de Leeuw, W., Waas, F., "Interactive Visualization of Multidimensional Feature Spaces," in Proc. of Workshop on New Paradigms for Information Visualization, Washington DC, Nov. 2000.

Park, et al., "Re-ranking Algorithm Using Post-Retrieval Clustering for Content-Based Image Retrieval," Information Processing and Management, vol. 41, No. 2, pp. 177-194, 2005.

Robertson, et al, "Data Mountain: Using Spatial Memory for Document Management," In Proceedings of UIST '98, 11th Annual Symposium on User Interface Software and Technology, pp. 153-162, 1998.

\* cited by examiner

Graphic Figure Content Scaled To Fit Into Area For Iconic Element

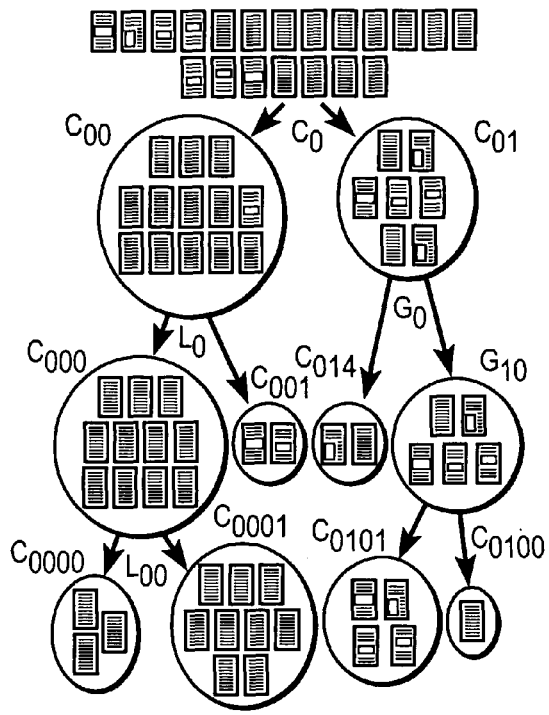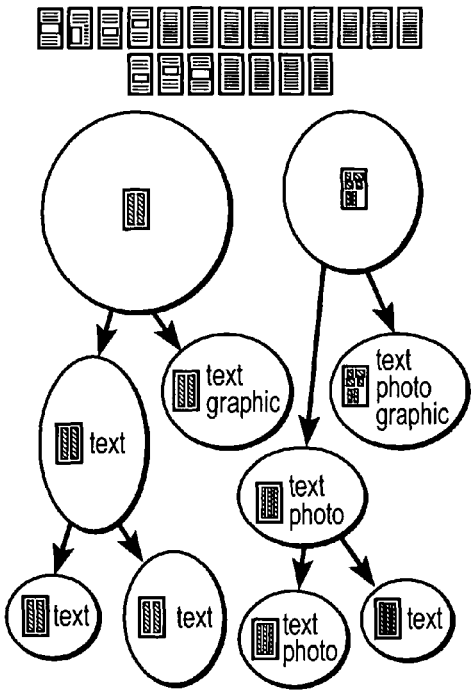
FIG. 7A
FIG. 7B
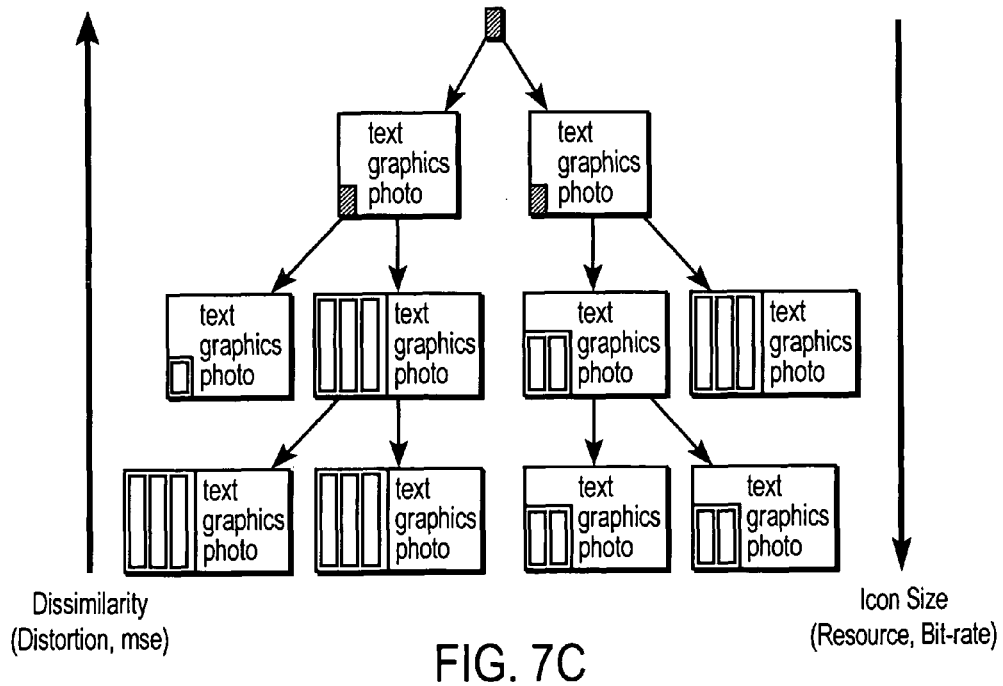
FIG. 7C

Greedy (Icon Size Only)

Generalized BFOS

Hierarchical Document Clusters

TREE PRUNING OF ICON TREES VIA SUBTREE SELECTION USING TREE FUNCTIONALS

FIELD OF THE INVENTION

The present invention relates to the field of document processing; more particularly, the present invention relates to creating icons for individual documents and collection of documents.

BACKGROUND OF THE INVENTION

With ever increasing amounts of digital documents the challenges for retrieval algorithms become bigger and effective solutions more and more important. The field of document retrieval is widely researched with a main focus on extracting and evaluating text in documents.

Document retrieval techniques can be categorized as text-based and image-based retrieval techniques. Depending on which technique is used, the results are presented to the user using text and images, accordingly. For example, in content-based image retrieval (CBIR) application search results may be displayed as images since no text information is available. On the other hand, often document retrieval results are given in text form only, since text analysis (e.g., OCR) was the only analysis performed on the document image.

Thumbnails have been used in addition to text for representing retrieval results. The search algorithms used for retrieval are based on text features only, whereas the thumbnail images are just displayed as "some additional information" without any direct linkage to the text results, with the exception that they represent the same document.

Xerox' enhanced thumbnails are created pasting keywords found in HTML pages into the corresponding locations in the thumbnails.

Besides displaying a list of retrieved text results, text-based retrieval techniques may also display the structure of all or part of the underlying feature space derived from the document database. The resulting images are visualizations of high-dimensional data, i.e. points in the feature space. Several methods exist to transform high-dimensional data into low-dimensional (2-dim.) data plots that can be displayed as an image. Example methods are dendrograms or multidimensional scaling techniques. Visualizations of document clusters using dendrograms are known in the art. For example, see van Liere, R., de Leeuw, W., Waas, F., "Interactive Visualization of Multidimensional Feature Spaces," in Proc. of Workshop on New Paradigms for Information Visualization, Washington DC, November 2000. Multidimensional scaling (MDS) has been used in the prior art as well. For example, see Leouski, A., Allan, J., "Visual Interactions with a Multidimensional Ranked List," Proc. of the 21st Annual International ACM SIGIR Conference on Research and Development in Information Retrieval, pp. 353-354, 1998. An approach referred to as the Data Mountain approach allows the user to define his own spatial arrangement of thumbnails in a simulated 3-D environment. For more information, see Robertson, G., Czerwinski, M., Larson, K., Robbins, D., Thiel, D. & van Dantzich, M., "Data Mountain: Using spatial memory for document management," In Proceedings of UIST '98, 11th Annual Symposium on User Interface Software and Technology, pp. 153-162, 1998.

Text-only visualization of text-based retrieval results is performed by the software RetrievalWare from the company Convera, http://www.convera.com/Products/rw_categorization.asp. Given a list of text-based retrieval results, Convera provides the user with an automatic categorization of the retrieval results displayed in form of a limited number of folders with labels containing a characteristic word or phrase of a category. Convera calls the algorithmic technique dynamic classification. Results of the classification are visualized as folder images with attached text labels.

Use of text features in document retrieval, searching and browsing is widely employed. Besides simple listings of text results, visualizations of retrieval results published in the prior art consist either of traditional document thumbnails or of visualizations of the high-dimensional feature space, applying, e.g., dendrograms or multidimensional scaling techniques (see van Liere, R., de Leeuw, W., Waas, F., "Interactive Visualization of Multidimensional Feature Spaces," in Proc. of Workshop on New Paradigms for Information Visualization, Washington DC, November 2000).

In the case of thumbnail visualizations, the algorithms used for thumbnail creation typically just uniformly scale individual images. There is no explicit control over what features the user will recognize in the individual thumbnails, what information is lost, or what information is conveyed through a collection of thumbnails. An exception is the SmartNail technology that creates thumbnail-like images with focus on showing readable text and recognizable image portions. With the SmartNail technology, the thumbnail visualization is derived from information of a single image only and is not linked to any specific query-driven retrieval results. However, the SmartNail technology computes image representations for individual images, not for document collections, with no knowledge of query information. For more information on the SmartNails technology, see U.S. patent application Ser. No. 10/435,300, entitled "Resolution Sensitive Layout of Document Regions," filed May 9, 2003, published Jul. 29, 2004 (Publication No. 20040145593).

In the case of high-dimensional data visualization, the user is confronted with an abstract representation of potential features without any association to the document image. MDS and dendrogram visualizations do not convey information on the document image, only arrangements of extracted features. The Data Mountain approach uses conventional thumbnails arranged by the user following personal preferences. For a different user, the structure is not meaningful.

Since screen area is often very limited, it may not be possible to show visualizations for each individual document on the screen. Therefore, it is natural to group documents that have similar features and associate each group with a label. This grouping, or clustering, is a common technique in retrieval applications. Clustering of retrieval results, in contrast to clustering the entire data set without having a query, is referred to herein as post-retrieval clustering. See Park, et al., "Re-ranking Algorithm Using Post-Retrieval Clustering for Content-Based Image Retrieval," Information Processing and Management, vol. 41, no.2, pp. 177-194, 2005. Clusters are typically created with respect to text features, color features or statistics on connected components. Cluster labels are typically text descriptions of the common cluster content.

Clustering may be performed in other ways. In one exemplary document system, textures are used to categorize and cluster documents in order to support query-by-example. Textures, describing document layout, are query inputs by the user. The system uses a clustering algorithm to respond with returning documents matching the user-described document layout. Clustering algorithms such as K-means or Sum-of-Square-Errors are used to group documents with respect to traditional document features. These algorithms may return a set of cluster prototypes, visualized as icons, one of which can be used to perform a further query. For more information, see U.S. Pat. No. 5,933,823, entitled "Image Database Browsing and Query Using Texture Analysis," issued Aug. 3, 1999.

In general, clustering techniques can be split into bottom-up and top-down techniques. The bottom-up, or agglomerative, techniques begin by treating each data point as its own cluster and then performing the merger of clusters on the way up to the top. The top-down, or divisive, techniques begin with all data being one cluster and then gradually breaking this cluster down into smaller and smaller clusters. For more information on devisive techniques, see, Duda, R. O., Hart, P. E., "Pattern Classification and Scene Analysis," Wiley, New York, 1973.

Another characterization of clustering techniques is monothetic vs. polythetic. In a monothetic approach, cluster membership is based on the presence or absence of a single feature. Polythetic approaches use more than one feature. See, Kummamuru, K., et al., "A Hierarchical Monlothetic Document Clustering Algorithm for Summarization and Browsing Search Results," Proceedings of the 13th international conference on World Wide Web, New York, NY, USA, pp. 658-665, 2004.

SUMMARY OF THE INVENTION

A method and apparatus for creating visualizations using tree functionals is described. In one embodiment, the method comprises representing a group of document images using a plurality of visualizations that visualize document layout information for the group of document images based on one or more display device characteristics and based on content of the group of documents, and adapting the plurality of visualizations to an available display by removing one or more visualizations from the plurality of visualizations based on at least two functional values.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 7A is an example of a cluster tree with leaf nodes.

FIG. 7B illustrates the cluster tree of FIG. 7A with an iconic representation for each node on the tree.

FIGS. 7C-7E show an example of an icon tree and selected leaf nodes after pruning for displays of different width.

DETAILED DESCRIPTION OF THE PRESENT INVENTION

Figure 1:
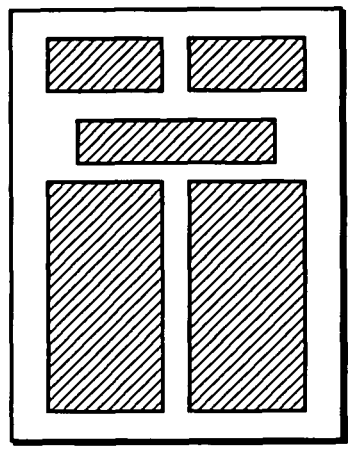
FIG. 1 shows examples of descriptions of visual document layout features of images using a new iconic visualization.
Figure 1:
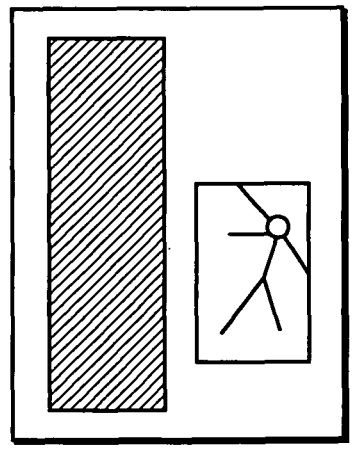

A method and apparatus for visualization of document retrieval results for one or more documents are described. The results are displayed with dynamic document icons. In one embodiment, these icons reflect geometric and logical information contained in a document collection and adapt to changes of display characteristics, document content, other documents, and/or user input. In one embodiment, each visualization maps vector information about the documents to perceived information user's display characteristics and user input.

In one embodiment, the visualization is adapted. In one embodiment, the visualization is an icon tree representing a document collection. In the tree, each node represents a specific collection of document layout features. In a display constrained application, the tree may be pruned using subtree selection. A subtree is selected subject to the constraint that a visualization of the subtree fits into a given pixel area. The subtree selection is based on two or more tree functionals. In one embodiment, the subtree selection process calculates tree functionals reflecting distortion of a subtree and area dimensions of a subtree visualization. After calculating tree functionals, a technique finds an optimal subtree (to reserve or keep) given tree functionals for distortion and visualization area.

In one embodiment, a method for pruning the icon tree by subtree selection operates by selecting the subtree that has the smallest ratio of distortion versus the required visualization area of all subtrees with a specified root node. In one embodiment, a globally optimal method for subtree selection is described considering dissimilarity of elements of a cluster and combined icon width simultaneously. The method adapts a generalized BFOS algorithm used in compression to determine optimal rate-distortion points to the icon tree pruning problem. See Chou, et al., "Optimal Pruning with Applications to Tree-Structured Source Coding and Modeling," IEEE Transactions on Information Theory, vol. 35, no. 2, pp. 229-315, March 1989.

A navigation method is also disclosed. In one embodiment, navigation through a document collection occurs by selection of subtrees of a specified root node. In such a case, selection is done by evaluation of distortion and visualization area tree functionals and choosing the subtree with minimal distortion/visualization area value. The navigation of the document collection is by successive subtree selection.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The dynamic document icons are visualizations of documents and document collections that communicate general layout information (e.g., geometric and logical information) of the documents and document collections. Such information is described by features derived from the documents. That is, in one embodiment, in order to overcome some of the drawbacks of the prior art, iconic images are produced that contain information about logical and geometric features of the documents, expressed in visual form. In one embodiment, the iconic representations represent geometric and logical layout information throughout document collections and yet surrender readability of text. The size of the visualization depends on the feature values of the document collection.

The selection of layout information of a document image may be improved, and potentially optimized, to ensure that the information contained in the visualization helps the user to recognize a document. For example, if in a conventional thumbnail view, thumbnails of all results shown on a screen page look the same (since high resolution features lost in the downsampling process were the only discriminative features), then the information can be conveyed by showing only one of those thumbnails acting as a unifying visualization for all documents on the screen page. This would allow more space for additional text results. In one embodiment, the unifying thumbnail visualization most likely contains only high-level document information (e.g., column layout information). Visualization of such a column layout is possible by an iconic representation, even smaller than the initial thumbnail size. The user could still recognize a column layout, assuming that the contrast between column and background is large enough.

Thus, with focus on visualization of document specific features, in one embodiment, the feature space is narrowed to document features that provide the user with information that can be visualized more easily through images than expressed by a text description. General features that are easily recognizable visually, but much harder to explain by text, are shape, texture, position, and color. In one embodiment, these general features are linked to document specific features in the following way.

shape→rectangular shapes of document zones, columns
texture→text (bold and plain), graphic, image
position→zone location, reading order
color→spot color, color images and graphics FIG. 1 shows examples of descriptions of visual document layout features by images using a new iconic visualization. If column layout, title and image location are the information that needed to be conveyed to the user, then the iconic visualizations express that information in a reduced size in comparison to regular-size thumbnails or text-only versions.

Many features discussed above are available as the result of a document layout analysis. These include, but are not limited to, bounding boxes of document zones, grouping into columns and reading order. These may be obtained in a manner well-known in the art, such as Aiello, et al., "Document Understanding for a Broad Class of Documents," International Journal on Document Analysis and Recognition (IJ-DAR), vol. 5(1), pp. 1-16, 2002. Furthermore, in one embodiment, zones are classified according to their content. In one embodiment, three classes are considered: text, graphic, and image content, and text zones are further classified as title, section heading, or body text.

In one embodiment, a partitioning of the features into two categories, geometrical and logical features, is performed. Geometric features include, for example, column layout and location of zones, whereas logical features include, for example, zone content and text characterization.

Besides a division into geometric and logical features, in one embodiment, a hierarchical structure can be imposed. A column is created from document zones. The content of a zone may be text, including a title, or an image including a text caption.

Figure 2:
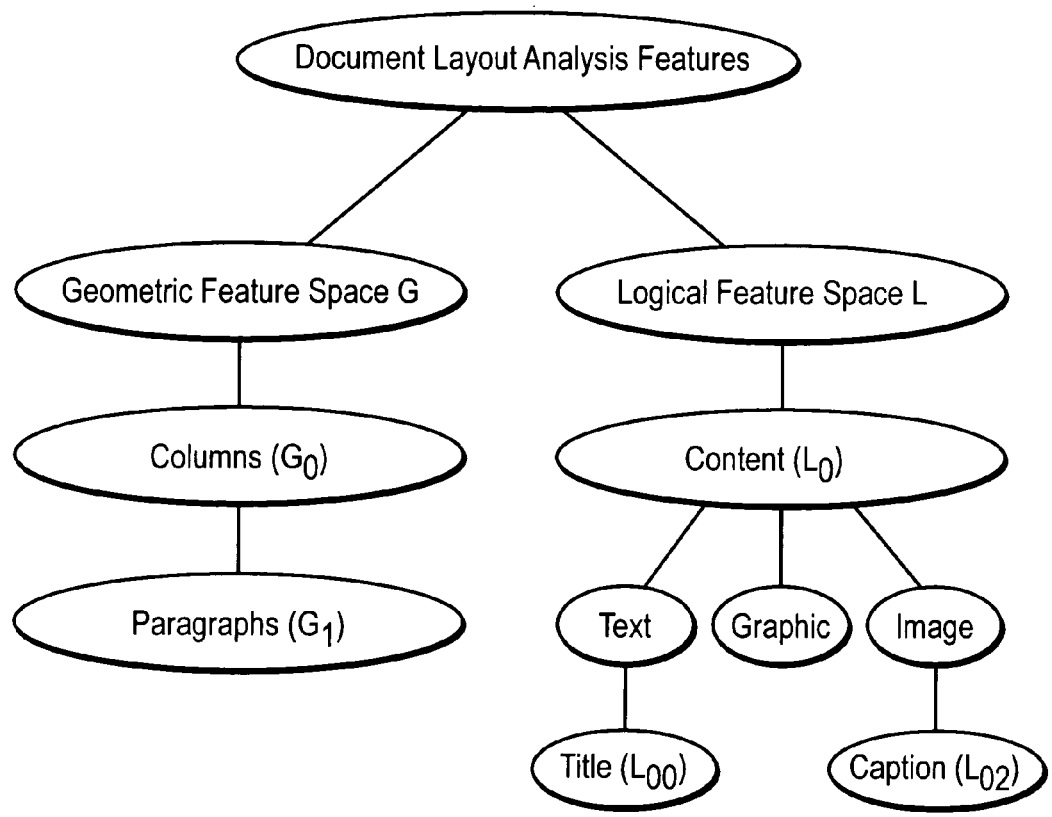
FIG. 2 illustrates one embodiment of a hierarchical organization of layout analysis features divided into geometric and logical features.

FIG. 2 illustrates one embodiment of a hierarchical organization of layout analysis features, divided into geometric and logical features. The document feature space is divided into a logical feature space L and a geometrical feature space G. In one embodiment, the features $L_i$ in L and $G_i$ in G are ordered hierarchically, denoted by $L_0 > L_1 > \ldots > L_n$, and $G_0 > G_1 > \ldots > G_m$.

An Exempllar Dynamic Document Icon Generation System

In one embodiment, a dynamic document icon generation system generates visualizations of clusters of document images. Each visualization contains document layout features. In one embodiment, text is suppressed in the visualization. Thus, original layout features are visualized and readability of text is neglected. In contrast to the prior art, visualizations depend not only on the document content, but also on the constraints given by the display device. Examples for those constraints include, but are not limited to, contrast ratio, device resolution (absolute number of pixels and relative dpi) and monochrome-vs.-color.

Figure 3:
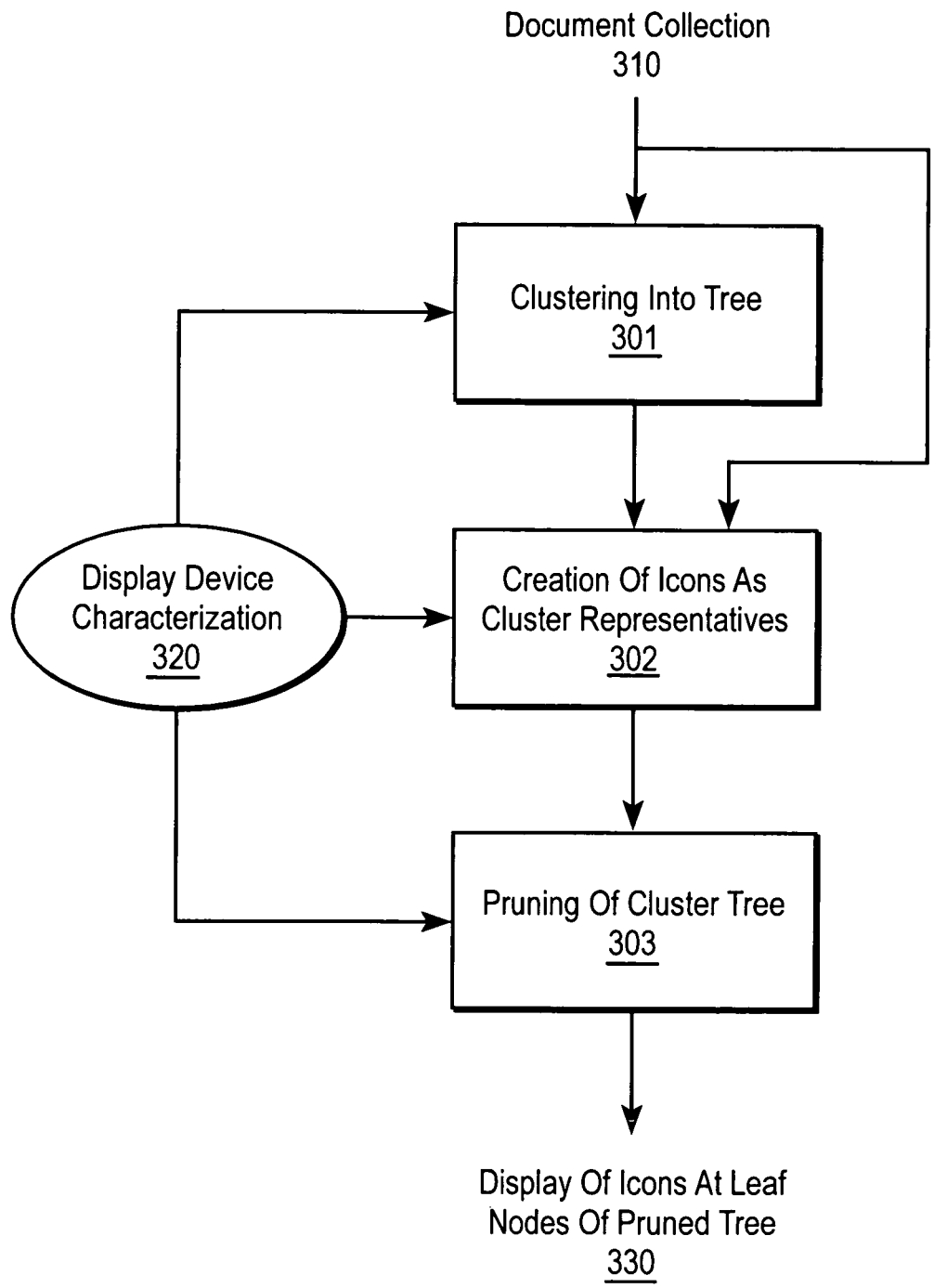
FIG. 3 gives a schematic overview of a display-adaptive visualization system for document layout features.

In one embodiment, the system comprises three units: a tree-clustering unit, an icon-creation unit, and a tree-pruning unit. Each of these units may operate based on display characteristics of the display device that is to display the dynamic document icons. FIG. 3 gives a schematic overview of a display-adaptive visualization system for document layout features. Referring to FIG. 3, tree-clustering unit 301 clusters document images in collection 310 into a tree. In one embodiment, tree-clustering unit 301 may operate based on display device characteristics 320. An icon creation unit 302 creates icons as cluster representatives in response to tree-clustering unit 301 clustering document collection 310 into the tree, as well as in response to tree pruning unit 303 pruning the cluster tree. One or both of the icon creation unit 302 and tree pruning unit 303 may operate based upon display device characteristics 320. The output of the system are iconic representations (icons) 330 from leaf nodes of the pruned tree.

The system of FIG. 3 operates on a set of documents. This set may be the result of a text query or a collection in a file folder. Structural information about the layout of the documents is assumed to be available.

Clustering Documents into a Tree

In one embodiment, documents are clustered using post-retrieval clustering with respect to visualizable features. In each clustering step, a unique geometric or logic feature is chosen to drive a split decision. In that way, the creation of visual labels (in iconic form) unambiguously reflecting the clustering decisions with respect to logical and geometric features will be possible.

In one embodiment, the clustering technique splits the data into sets with homogeneous features, i.e. ideally a clearly dominating logical or geometric feature. In one embodiment, motivated by the common searching practice of starting with broad search criteria and fine tuning them successively, divisive techniques are used, instead of agglomerative hierarchical clustering, since the complete cluster hierarchy from root to leafs will not be needed.

In one embodiment, hierarchical monothetic divisive approach is chosen. Monothetic division is preferred as it is easier to provide a non-ambiguous visualization. In this approach, at each level i in the hierarchy, the current data set is clustered individually according to the a layout feature $L_k$ and a geometric feature $G_l$. In one embodiment, the clustering is performed using the Min-max Cut (MMC) algorithm, which is well-known in the art (Ding, C. H. Q, et al., "A Min-max Cut Algorithm for Graph Partitioning and Data Clustering," Proc. Int'l Conference on Data Mining, San Jose, Calif., pp. 107-114, 2001). Alternatively, a k-means algorithm could be used.

In one embodiment, tree clustering unit 301 applies a monothetic (single feature), divisive (top-down) hierarchical clustering technique to document images. The three zone characteristics position and shape (hierarchically structured), zone texture, and zone color define three directions in the global document feature space. These subspaces of the feature space are denoted by $F_1, F_2, F_3$.

Figure 4:
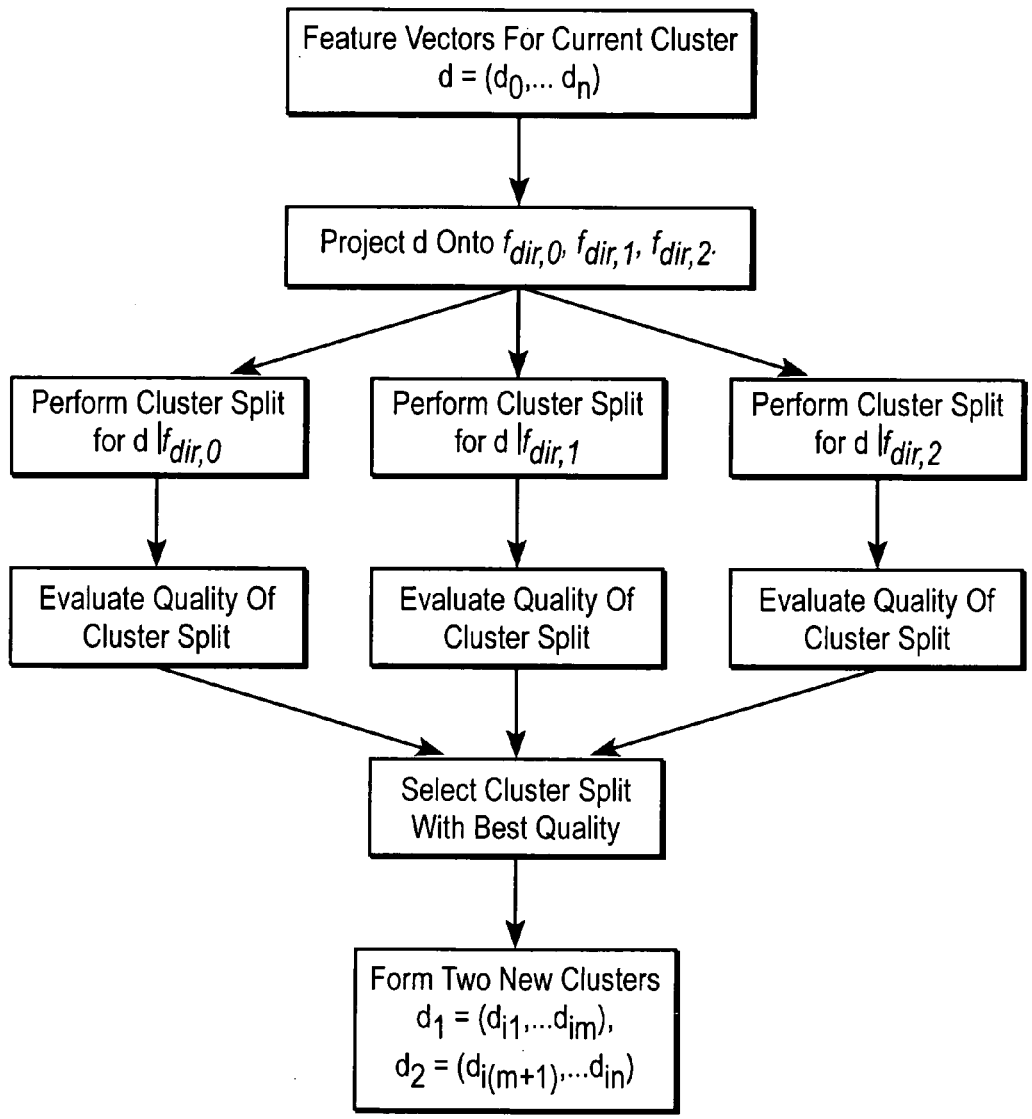
FIG. 4 shows an overview of one embodiment of a splitting procedure.
Figures 5A, 5B, 5C, 5D, 5E, 5F, 5G, 5H:
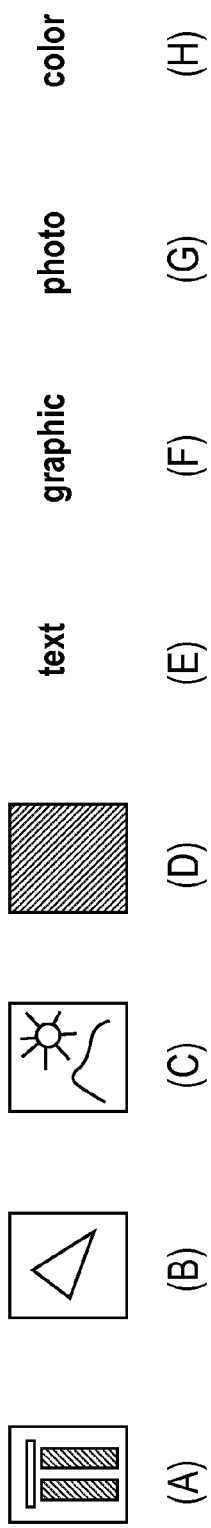
FIGS. 5A-5H illustrate examples of iconic representations.

At each clustering step, the current feature data of the current document set is projected onto each of the individual subspaces of feature space. The resulting feature vectors are processed by a Min-max Cut algorithm described below or by the k-means algorithm. In one embodiment, the algorithm attempts to maximize similarity of feature vectors within a cluster and minimize similarity of feature vectors between two different clusters. Under the condition that the similarity within a cluster is sufficiently large, the cluster split for each feature subspace is evaluated and the best one chosen as the final clustering split. That way the clustering split is performed in a preferred subspace of the feature space. FIG. 4 shows an overview of the splitting procedure.

Min-Max Cut Algorithm

In one embodiment, the tree clustering unit 301 uses a Min-Max algorithm as part of the clustering process. In one embodiment, the clustering method used is that described in Ding, C. H. Q, et al., "A Min-max Cut Algorithm for Graph Partitioning and Data Clustering," Proc. Int'l Conference on Data Mining, San Jose, Calif., pp. 107-114, 2001.

Given a data set D of n elements and an n×n association (or weight) matrix W, the goal is to find a partitioning of D into subsets A and B that meets the min-max principle—minimize similarity between clusters and maximize similarity within a cluster. The similarity or association between two data elements u and v is given by the matrix entry wuv. The similarity between subsets A and B is the cut size $$cut(A, B) = W(A, B) \qquad (1)$$

with $$W(A, B) = \sum_{u \in A, v \in B} w_{uv}$$

and W(A): =W(A,A).

The goal is now to minimize cut(A,B) and maximize W(A) and W(B) simultaneously. In one embodiment, this is achieved by minimizing the objective function given below $$Mcut(A, B) = \frac{cut(A, B)}{W(A)} + \frac{cut(A, B)}{W(B)} \qquad (2)$$

Assuming the matrix W is given in the canonical form given below $$W = \begin{bmatrix} W_A & W_{A,B} \\ W_{A,B} & W_B \end{bmatrix} \quad (3)$$

the Fiedler vector of W has to be determined. The Fielder vector is the second eigenvector of W corresponding to the second largest eigenvalue (the largest eigenvalue is 1). Sorting the Fiedler vector results in a useful linear search order for finding the best partition into sets A, B.

Following the order given by the sorted Fiedler vector, the Mcut function from Eq. (2) is evaluated. In one embodiment, the lowest Mcut value corresponds to the optimal cut point.

A refinement of this cut point may be performed by a linkage-based refinement method, such as, for example, that refinement method described in Ding, C. H. Q, et al., "A Min-max Cut Algorithm for Graph Partitioning and Data Clustering," Proc. Int'l Conference on Data Mining, San Jose, Calif., pp. 107-114, 2001. This method checks the points close to the computed cut point for possible local improvement of the cut.

In one embodiment, the MMC algorithm is applied in a hierarchical fashion to the document collection using the geometric and logical features. In one embodiment, at each step in the hierarchical clustering algorithm, the cluster with the least similarity inside of the cluster is identified. That cluster is then split into two new clusters several times, once for each feature direction (e.g., $F_1$, $F_2$, $F_3$ or just $G_l$ and $L_K$. The splits are evaluated and the "better" split, i.e. the split that produces the most similar new clusters is chosen. The similarity measured in the clustering algorithm is measured for normalized features, such that similarity measures from different feature sets are comparable. One way to perform such a normalization is to interpret the data projected onto feature space subspaces as realizations of a random variable with a probability density distribution, i.e. the data are an empirical pdf. A random variable X can be normalized via the well known formula (X-E(X))/STD(X). After performing such a normalization, the best split with respect to a certain subspace of feature space $F_{dir}$ is measured by the function Mcut from Eq.(2) above, the cut point producing an optimal partition $$A|_{F_i}*, B|_{F_i}*$$

for each feature direction $F_i$.

The selection of the winning cluster split out of all subspaces of feature space can be computed as the subspace $F_{i*}$ with Mcut $$(A|_{F_i}*, B|_{F_i}*)$$

being largest for i=i* among all feature directions i=1,2,3.

$$F_{i*} = argmax_{F_i} Mcut(A|_{F_i}*, B|_{F_i}*).$$

The following pseudo code contains details of one embodiment of hierarchical geometric-logic clustering.

```
MAX_iter = 10
T = 0.01
I = Ø
H(F_i) = maximal hierarchy level for feature subspace F_i
while (iter < MAX_ITER) and (max{sim(v)|v in V_L} > T)
    find leaf node v with smallest similarity value sim(v) of associated
    data cluster, set D = data(v)
    for i=1:N
        if (h(F_i) < H(F_i))
            compute optimal split of current data set D into A_i = A|F_i
and
            B_i = B|F_i projected onto the subspace F_i using the Mcut
algorithm.
            add i to valid index set I
        end
    end
    if (I ≠ Ø)
        compute i* = arg min_{i∈I} w(Mcut(A|F_i,B|F_i))
        split data set D into sets A|F_{i*} and B|F_{i*}
        add two new leaf nodes representing A|F_{i*} and B|F_{i*} to V_L
        remove node representing D from V_L
        iter ++
    else
        iter = MAX_ITER % stop iteration
    end
    I = Ø
end
```

Icon Tree—Icons as Cluster Representatives

After clustering has partitioned the document collection into groups that can be labeled by distinct visualizable features representing high level document information, those features have now to be turned into a visualization satisfying one or more conditions. In one embodiment, the visualization satisfies the following condition: select information, potentially optimal information, to be contained in the visualization from cluster label features that are perceivable by the user on a given available screen area. This condition prevents the creation of images that attempt to visualize cluster-label-features, but fail to convey the information in a specific display environment due to too little contrast at edges, too small text, indistinguishable shades of color, etc.

Clusters are typically labeled with cluster representatives. In order to visualize properties of the features vectors contained in a cluster, an iconic representation of layout information contained in the cluster is chosen as a cluster representative. In one embodiment, an icon is construed in the following way.

Iconic elements are created for individual layout features. Document zones are represented by rectangles. Textures by selected fillings of text zones or labels. For example, text is visualized by fillings with shades of gray (e.g., light gray for plain text, dark gray for bold text). A picture unit is visualized by an iconic image element and graphics by an iconicgraphic element. Examples are shown in FIGS. 5A-H. Referring to FIGS. 5A-H, examples from left to right include plain and bold text, graphic, photo, color, text label, photo label, and color label.

In one embodiment, each element, including a "whitespace element," has a predetermined fixed minimal size, and scaling below that minimal size is not allowed. The minimal size depends on one or more display properties such as, for example, contrast ratio. Displays with higher contrast ratio allow a smaller minimal size than displays with lower contrast ratio.

Each split in the clustering procedure adds one of the icon elements to the already created icon for the parent cluster. In order to force distinguishability between icon elements, all elements of the parent icon may have to be scaled in order to guarantee that the newly added elements doe not need to be scaled below its minimal size. That way the size of the complete icon depends on the clustering procedure. An example for icons of different size for two and three column text layout is explained in the following.

Figure 6A:
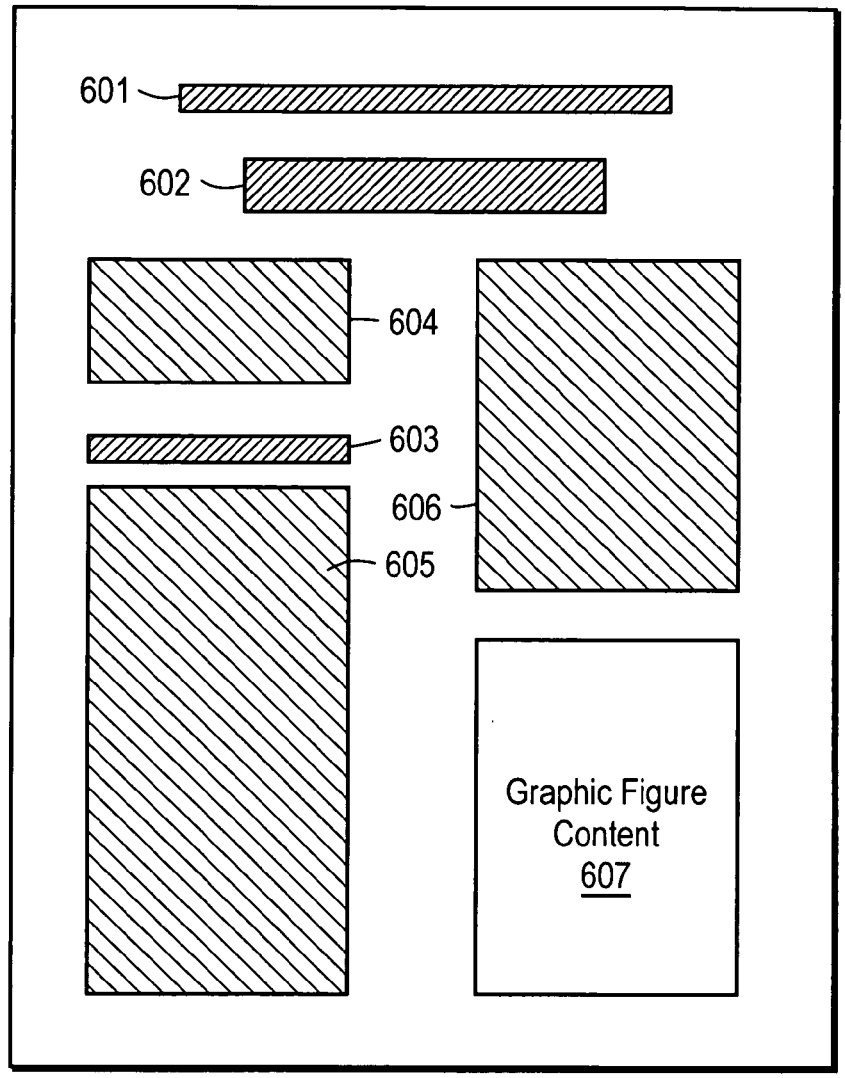
FIGS. 6A and 6B illustrate an example of a document page and an icon corresponding thereto.
Figure 6B:
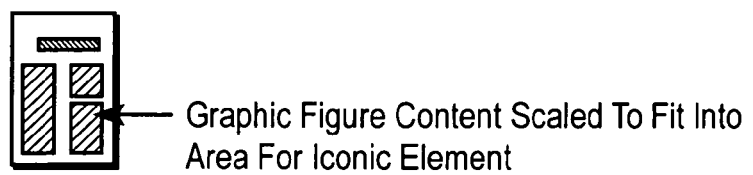

Let minimal dimensions for the elements whitespace w and text zone t be given $s_{min}[w]=4$ pixels, $s_{min}[t]=8$ pixels. Picturing two columns in an icon means that two rectangles of minimal dimension 8 have to placed, separated and enclosed by whitespace of minimal dimension 4. That results in a minimal width of 28 pixels. In order to preserve the aspect ratio of the original document, the height of the icon is determined as 28 (heightorig/widthorig). For an 8½ by 11 inch letter size document, the icon size results to 28×36.4 pixels. An analogue calculation results in an icon size of 40×52 pixels when picturing three columns. Since each node in the cluster tree is represented by an icon, the cluster tree is transformed into an icon tree. The visualizations of the nodes of this icon tree are called dynamic document icons. FIGS. 6A and 6B illustrates the example of icon creation picturing two and three column layout. Referring to FIGS. 6A and 6B, the complete two-column icon is 28×36 pixels in size, while the three-column icon is 40×52 pixels in size in order to guarantee minimal sizes for the individual elements.

The cluster tree in FIG. 7A results from applying the hierarchical geometric-logic clustering to a subset of 20 documents. These articles are laid out in various column formats containing text, graphics or images. The data base comes with layout analysis information for each document. This information contains characterization of document zones, content type (text, graphic, image), reading order, column layout, etc.

In the example, a maximum of only two levels of hierarchy are considered in the feature space, one level of geometric and two levels of logical features. The geometric feature $G_0$ is the number of columns, the logical feature $L_0$ is the distribution of document content with respect to text, graphics, and images. The second level of logical feature hierarchy, the $L_{00}$ feature, represents a title as a sub category of text. The feature space for the example set is shown in Table 1 below.

TABLE 1

Geometric (column 1) and logic (column 2-5) features for example set of 20 documents.

| Document # | 1<br># of<br>columns | 2<br>% of text | 3<br>% of graphics | 4<br>% of images | 5<br>title |
|---|---|---|---|---|---|
| 1 | 3 | 0.6932 | 0.0398 | 0.2670 | yes |
| 2 | 3 | 0.6517 | 0.0004 | 0.3478 | no |
| 3 | 3 | 0.5306 | 0.1968 | 0.2724 | yes |
| 4 | 5 | 0.7400 | 0 | 0.2600 | yes |
| 5 | 2 | 1.0 | 0 | 0 | no |
| 6 | 2 | 1.0 | 0 | 0 | no |
| 7 | 1 | 0.0180 | 0.9820 | 0 | no |
| 8 | 2 | 1 | 0 | 0 | no |
| 9 | 2 | 1 | 0 | 0 | yes |
| 10 | 3 | 1 | 0 | 0 | no |
| 11 | 2 | 1 | 0 | 0 | no |
| 12 | 2 | 0.5285 | 0.4715 | 0 | no |
| 13 | 2 | 1 | 0 | 0 | no |
| 14 | 2 | 0.6853 | 0.3147 | 0 | no |
| 15 | 2 | 1 | 0 | 0 | yes |
| 16 | 3 | 0.6796 | 0.0010 | 0.3193 | yes |
| 17 | 2 | 1 | 0 | 0 | no |
| 18 | 2 | 1 | 0 | 0 | no |
| 19 | 2 | 1 | 0 | 0 | no |
| 20 | 2 | 1 | 0 | 0 | yes |

The final cluster hierarchy is up to four levels deep and divides the document collection into sub-collections containing two-columns-text-only-with-title, two-columns-text-only-without-title, two-columns-mixed-content, three-columns-text-only, three-columns-mixed-content and not-two-or-three-column documents.

FIG. 7B illustrates the cluster tree of FIG. 7A with an iconic representation for each node on the tree.

Pruning of Icon Tree in Order to Fit Display Size Constraints

The leaf nodes of the icon tree are used as visualizations of groups of documents. Given a specific available display area, it may not be possible to display all leaf node icons at their original size. With pruning the icon tree from bottom to top, the number of leaf nodes decreases, and the icon sizes may decrease. In one embodiment, the icon tree is pruned until the set of leaf node icons fits into the available display area. If the display area is large, less pruning has to be performed compared to the case that the display area is small.

The number of clusters, the size of the display screen, and the content of the document collection influence the visualization. With a change of display size, the visualizations should change as well. The same is true for changes to the document collection content. Due to these dependencies, each change in the input conditions may change the iconic visualizations. Therefore, the iconic visualizations are dynamic, i.e., dynamic document icons.

Figure 10:
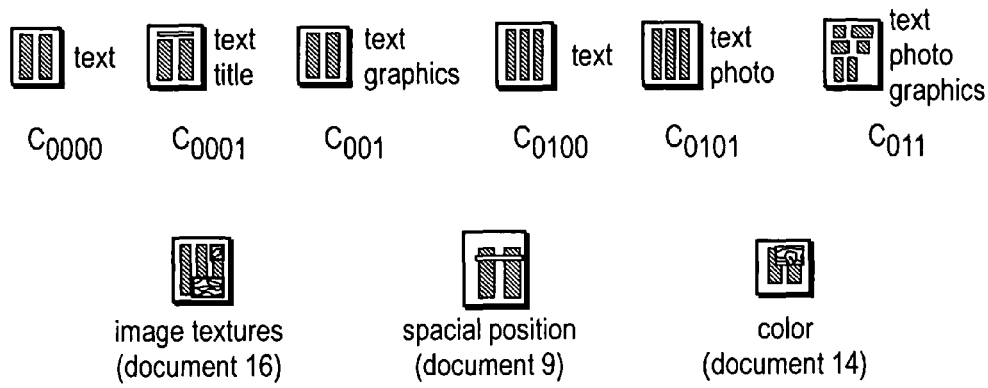
FIG. 10 shows document icons for the leaf clusters created in FIG. 7A, as well as examples for dynamic document icons representing individual page layout information.

FIG. 10 shows dynamic document icons for the leaf clusters created in FIG. 7A, as well as examples for dynamic document icons representing individual page layout information.

Exemplary Tree Pruning

A tree pruning step is applied to reduce the number of leaf nodes and the area that is covered by the leaf node icons to fit into the available display space. FIG. 7E-F shows an example of an icon tree and selected leaf nodes after pruning for displays of different width. FIG. 7F illustrates three levels of the hierarchical layout feature structure of the document collection, as represented by the icon trees in FIG. 7C With a given a tree structure (e.g., an icon tree for a document collection), the tree or subtrees of the tree are evaluated with respect to a specific criterion (e.g., the balance of the tree in terms of numbers of cluster node elements, the distortion of the tree, etc.).

Real-valued functions on trees and their subtrees are known as tree functionals. If a tree T is given by a collection of nodes $\{t_0, t_1, \ldots\}$, where $t_0$ is the root node, a tree functional u(S) is an assignment of a real number to all subtrees S of a given tree T in the same manner as described in Gersho, et al., "Vector Quantization and Signal Compression," Kluwer Academic Press/Springer, 1992. If S is a subtree of T, then T is called a parent tree of S.

In one embodiment, by defining tree functionals for tree properties of interest, pruning of a tree, or in more general terms a selection of a subtree, is performed by choosing the subtree with the "best" tree functional value, e.g. the smallest or the largest. Also, in one embodiment, a subtree (e.g., the best subtree) is chosen by evaluating ratios of tree functional values. Given the specific characteristics of an icon tree, tree functionals can be defined for the distortion of an icon subtree from a parent tree, for the area or width necessary for visualization of leaf nodes of a subtree, for the average or standard deviation of the number of elements in the leaf node clusters of a subtree, etc. In one embodiment, the selection of the best subtree is made based on the area width for visualization versus distortion in a manner similar to ratio evaluation used in rate-distortion algorithms.

In case of a pair of tree functionals evaluating distortion and number-of-bits, finding the subtree with a minimal distortion/number-of-bits is a common task in compression. In a more general sense, such a ratio can be interpreted as a ratio reflecting distortion versus resources available to represent the node data. A resource may be measured as the width of an icon. In one embodiment, given a limit on the resources, a determination is made as to the subtree that has the smallest distortion/resource value of the corresponding tree functionals.

A ratio of distortion vs. available resources ratio can also be defined for an icon tree. In one embodiment, the distortion is interpreted as dissimilarity of elements inside leaf icon nodes of a tree. This can be thought of as the loss associated with representing all the documents in the cluster with a single visualization. Resources necessary to represent the node data are given in terms of area or width of the visualization of the node, i.e. the area occupied by a node icon. Given a limit on the display width available to contain the leaf node icons of a subtree, in one embodiment, the subtree with minimal distortion/visualization area is identified. Alternatively, the subtree based at the root with the minimum distortion such that the width is less than a fixed value is identified.

In one embodiment, pruning of the icon tree adapts the visualization of layout features of a collection of documents to an available display width.

Using tree functionals, pruning is performed in a global, non-greedy fashion, by finding that subtree with the same root node as the icon tree that has the smallest distortion/visualization width value subject to visualization width≤display width.

If no further properties of the tree functionals are known, then a complex search mechanism is necessary to find the subtree with minimal distortion/visualization_width value. In case of monotonicity and linearity of tree functionals, however, faster search algorithms are possible. Evaluating tree functionals may be performed in the same way as set forth in Gersho, A. and Gray, R. M., "Vector Quantization and Signal Compression," Kluwer Academic Press/Springer, 1992; and Chou, P., Lookabaugh, T., Gray, R. M., "Optimal Pruning with Applications to Tree-Structured Source Coding and Modeling," IEEE Transactions on Information Theory, vol. 35, no. 2, pp. 229-315, March 1989. In one embodiment, a generalized BFOS algorithm is used to prune a tree by evaluation of the ratio of the two tree functionals distortion u1 and number of bits u2 under the assumption that one of the functionals is monotonically increasing, the other one monotonically decreasing, and that both are linear tree functionals.

For use in the icon tree representation, the total icon width of leaf node icons can be defined as a monotonically increasing functional (with a larger subtree the total icon width increases) that is linear, i.e. the value of the functional is given as the sum of the leaf node values. The distortion can be defined as a monotonically decreasing functional. Linearity can also be assured if an appropriate distortion measure; in this case, a dissimilarity measure is used.

Dissimilarity FunctionalIf clustering is performed using the k-means algorithm and the dissimilarity d(n) is measured as, $$d(n) = \sum_{x \in n} (x-c)^2,$$

where c is the centroid of the cluster, then this measure satisfies the monotonicity condition $$d(n) \leq \sum_{m \in C(n)} d(m).$$

See Ding, et al., "Cluster merging and splitting in hierarchical clustering algorithms," Proceedings of the 2002 IEEE International Conference on Data Mining (ICDM'02), pp. 139-146, 2002.

Other clustering method satisfying that monotonicity criterion is described in Hastie, et al., "The Elements of Statistical Learning: Data Mining, Inference, and Prediction." Springer Series in Statistics, Springer-Verlag, 2001. The Min-Max Cut method described in Ding. C., He, X., "Cluster merging and splitting in hierarchical clustering algorithms," Proceedings of the 2002 IEEE International Conference on Data Mining (ICDM'02), pp. 139-146, 2002, satisfies the monotonicity criterion with the reversed inequality sign.

A distortion functional D of a subtree S of T is defined as the sum of the dismmilarities of the all the clusters associated with leaf nodes of S:

$$D(S) = \sum_{n \in L(S)} d(n)$$

where L(S) is a the set of leaf modes of S. That means the D is a linear functional. In case that the dissimilarity metric satisfies the monoloucity condition from above, the linear functional D is monotonically decreasing.

Icon Width Functional

One example of defining an icon width functional is the following. Assume that the icon consists of two parts, a part that represents the geometric feature of the layout and one that reflects the content (e.g., text, graphics, photo, etc.). Examples are shown in the icon tree in FIGS. 7D and 7E. The part containing the geometric feature is increasing in width from parent to child node, i.e.

$$w(I_{geometric})(n) \leq w(I_{geometric})(m) \text{ where } m \text{ is a child of } n.$$

Since in each clustering step elements are added and their limit on minimal size may force all previously added elements belonging to that node to be enlarged. As a consequence, the condition $$w(I_{geometric})(n) \leq \sum_{m \in C(n)} w(I_{geometric})(m)$$

is satisfied.

The part containing the content are labels of various sizes showing the words text, graphics, and photo or other representative labels, e.g., iconic graphic elements or the largest graphic contained in the cluster. The width of such an element should satisfy the condition:

$$w(I_{content})(n) \leq \sum_{m \in C(n)} w(I_{content})(m)$$

One possible choice for content label creation for a binary tree may be obtained using the following code:

If split from parent n to children m1 and m2 is performed in content dimension
{
   if $d_{content}(n)|_{text} < d_{content}(m_2)|_{text}$ {
      scale_text($m_1$) = scale_text(n),
      scale_text ($m_2$)=scale_text(n)+$d_{content}(n)|_{text}$−
$d_{content}(m_2)|_{text}$/max($d_{content}(n)|_{text}$, $d_{content}(m_1)|_{text}$, $d_{content}(m_2)|_{text}$) else
{
      scale_text($m_1$) = scale_text(n) + ($d_{content}(n)|_{text}$ −
$d_{content}(m_2)|_{text}$)/max($d_{content}(n)|_{text}$, $d_{content}(m_1)|_{text}$, $d_{content}(m_2)|_{text}$)
      scale_text($m_2$) = scale_text(n)
   Analogue computation of scale_graphic and scale_photo parameters An icon width, or more general, a resource functional R of a subtree S of T is defined as $$R(S) = \sum_{n \varepsilon L(S)} \lfloor W(I_{geometric})(n) + W(I_{content})(n) \rfloor.$$

R is a linear functional. Due to the monotonicity conditions set forth above, R is monotonically increasing.

An Example of Tree Pruning Algorithm

Using the tree functionals D to measure layout dissimilarity of a subtree and R to measure the necessary width of the area of the collection of leaf node icons, a generalized BFOS algorithm as described in Gersho, & Gray, "Vector Quantization and Signal Compression," Kluwer Academic Press/Springer, 1992, is applied in order to find the subtree with the smallest D/R value such that visualization area width fits the display width $w_{display}$, i.e. leaf nodes are pruned until $R(S) \le W_{dipslay}$.

Figure 7D:
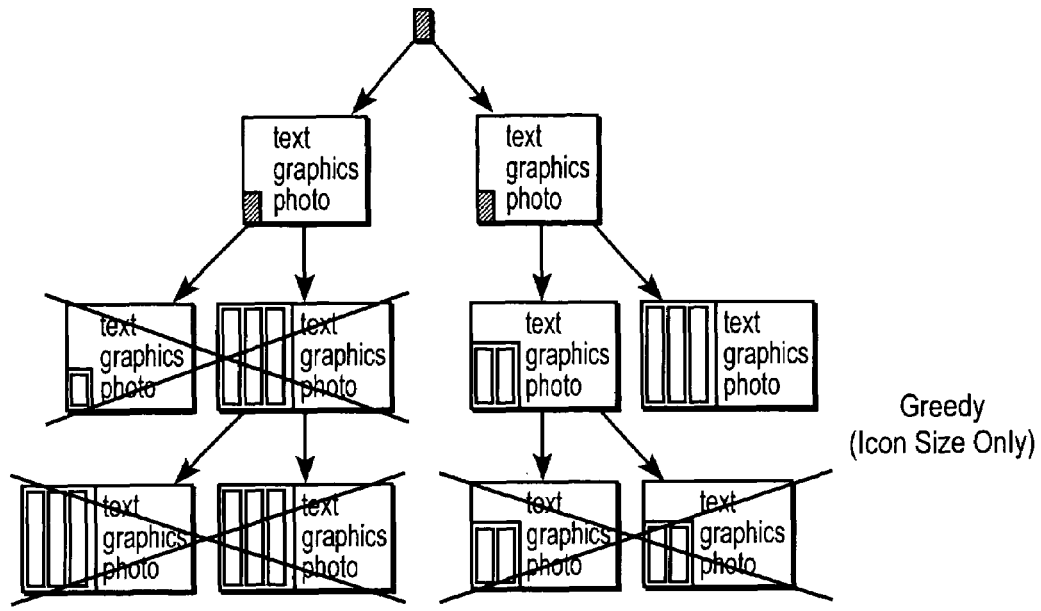
Figure 7E:
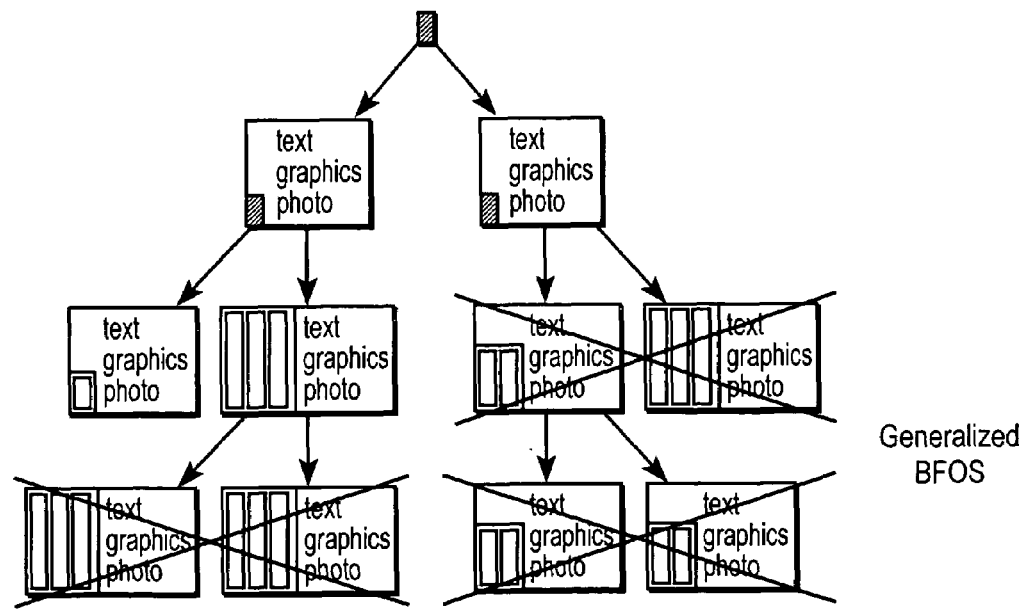
Figure 7F:
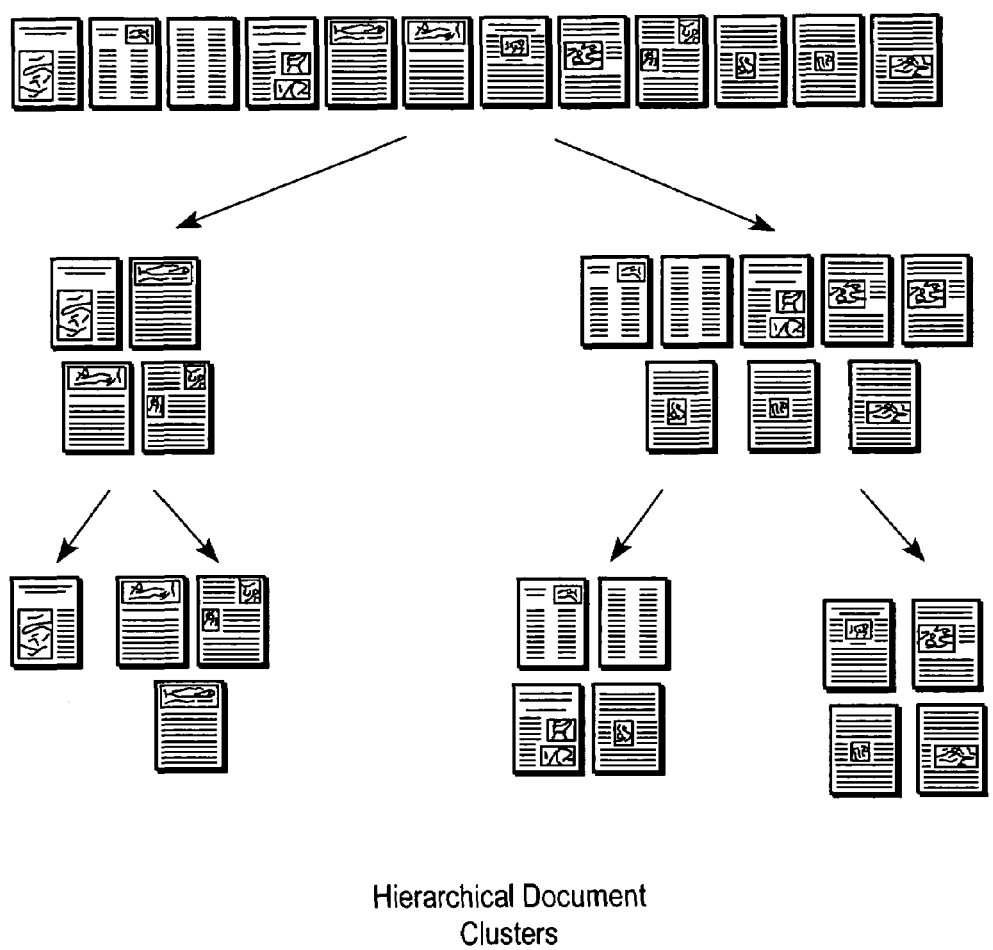
FIG. 7F illustrates three levels of the hierarchical layout feature structure of the document collection, as represented by the icon trees in FIG. 7C.

FIGS. 7D and 7E show results of pruning the icon tree of a document collection to fit a display size of 300 pixels by performing a greedy pruning (FIG. 7D), i.e. successively pruning the leaf nodes with the largest icon width, and a globally optimal pruning with respect to distortion/total_icon_width (FIG. 7E). The results in the bottom image consider dissimilarity of layout features in an icon cluster and icon width at the same time, whereas the result on the left only consider the icon width. The documents contained in the icon nodes are shown in FIG. 7F.

Figure 8A:
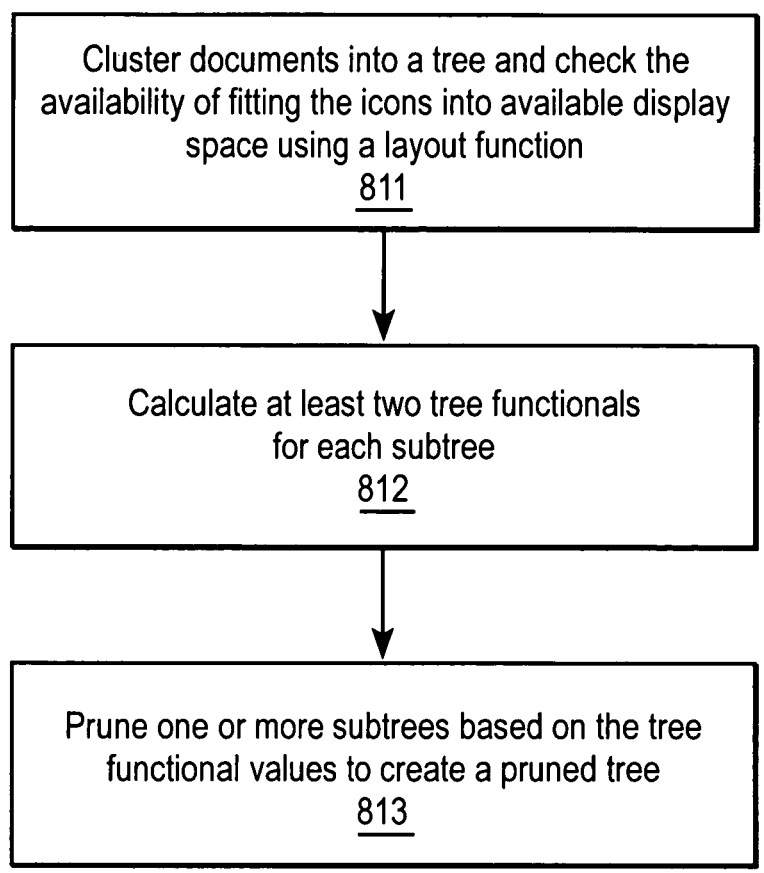
FIG. 8A is a flow diagram depicting combined clustering and pruning.

FIG. 8A is a flow diagram of one embodiment of a process that includes combined clustering and pruning. The process is used by processing logic that may comprise hardware (e.g., circuitry, dedicated logic, etc.), software (such as is run on a general purpose computer system or a dedicated machine), or a combination of both.

Referring to FIG. 8A, processing logic clusters documents into a tree and checks the availability of fitting the icons into available display space using a layout function (processing block 811). This is performed in response to receiving a document collection and display constraints (e.g., display contrast and display area size). Next, processing logic calculates at least two tree functionals for each subtree (processing block 812). In one embodiment, for each subtree, processing logic measures layout dissimilarity in a node (distortion) and size (area, width) of an iconic representation via tree functionals. Then processing logic prunes one or more subtrees based on the tree functional values to create a pruned tree (processing block 813).

If Sub-Additivity or Monotonicity of Functionals are not Met

In case that monotonicity of the sub-linearity of the tree functionals are not assured, more complex search methodologies can be applied. In such a case, the goal is to find a global optimum of the pruned tree given a specific display size. The two tree functionals, D and R need, in the worst case, to be evaluated for each possible subtree and stored while building the tree. After the tree is created, the pruned trees are sorted with respect to the sum of the width of the leaf nodes. Then the subtree with a sum of leaf node icon widths smaller than the given display width and smallest D/W ratio is chosen for pruning.

Figure 8B:
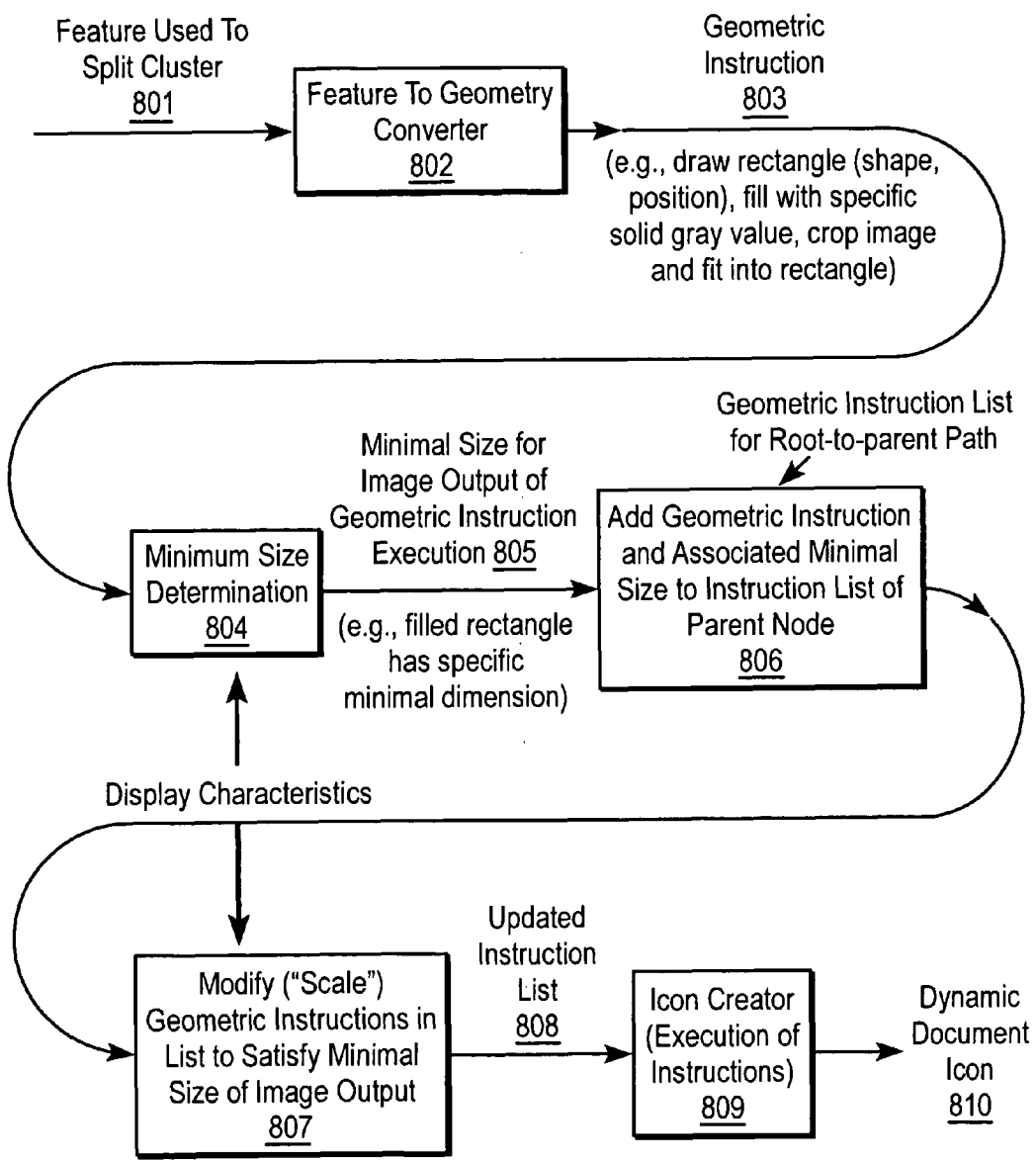
FIG. 8B is a flow diagram of one embodiment of a process for automatically creating icons as a cluster representation.

FIG. 8B is a flow diagram of one embodiment of a process for automatically creating icons as a cluster representation. The process is performed by processing logic that may comprise hardware (e.g., circuitry, dedicated logic, etc.), software (such as is run on a general purpose computer system or a dedicated machine), or a combination of both.

Referring to FIG. 8B, the process starts with processing logic receiving an indication of a feature used to split the cluster (processing block 801). In response thereto, processing logic performs a feature-to-geometry conversion (processing block 802). The result of the conversion is one or more geometric instructions 803. For example, the geometric instructions may direct the system to draw a rectangle (shape, position), fill the rectangle with a specific solid gray value, crop an image, and fit the image into a rectangle.

Processing logic then makes a minimal size determination (processing block 804) in order to determine the minimal size (805) for the image output of the geometric instruction execution (e.g., the filled rectangle has specific minimal dimensions).

Using the minimal size for the image output 805, processing logic adds the geometric instruction(s) and associated minimal size to an instruction list of the parent node (processing block 806) and modifies (e.g., scales) the geometric instructions in the list to satisfy the minimal size of the image output (processing block 807) to produce an updated instruction list (808). Processing logic creates a dynamic document icon 810 using an icon creator to execute instructions in the updated instruction list 808 (processing block 809).

Figure 9:
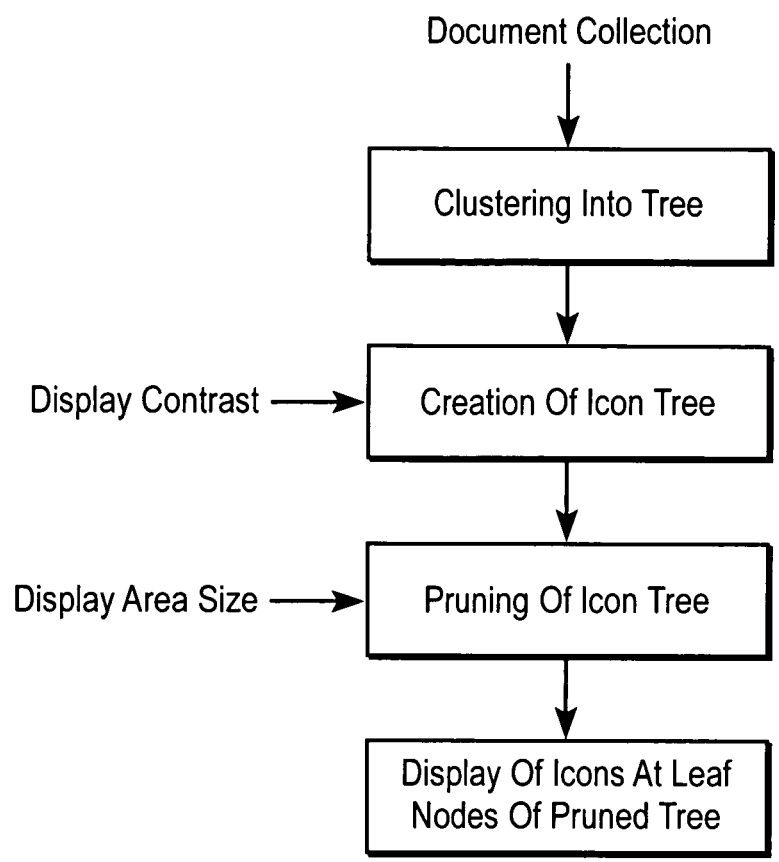
FIG. 9 illustrates a schematic overview of such a system.

Thus, in one embodiment, the system comprises a clustering tool, an icon creation tool and a tree pruning tool, in which the display characteristics influence the icon creation and the tree pruning. A schematic overview of such a system is shown in FIG. 9.

Iconic elements as described above can also be used to create an icon for a single document page, not a group of documents. As in the group case, layout features of a page are transforming into iconic elements. For visualizing photo or graphic documents units in the icon, either synthesized photo or graphic elements can be used or document image data cut out of the original page image and pasted at appropriate size into the icon. FIGS. 6A and B illustrate a document page and an icon. Referring to FIG. 6A, initial page units are shown for title author and a section headings 601-603, text 604-606 and the graphic unit 607. For the icon only the title unit, text columns and graphic units are requested to be visualized. The graphic content is scaled to fit the white rectangle. Also for these paste operations, a minimal size of the figure element is defined and has to be assured in the icon. Placement of iconic elements can be made proportionally to the positions of the associated page units on the original page.

Figure 6C:
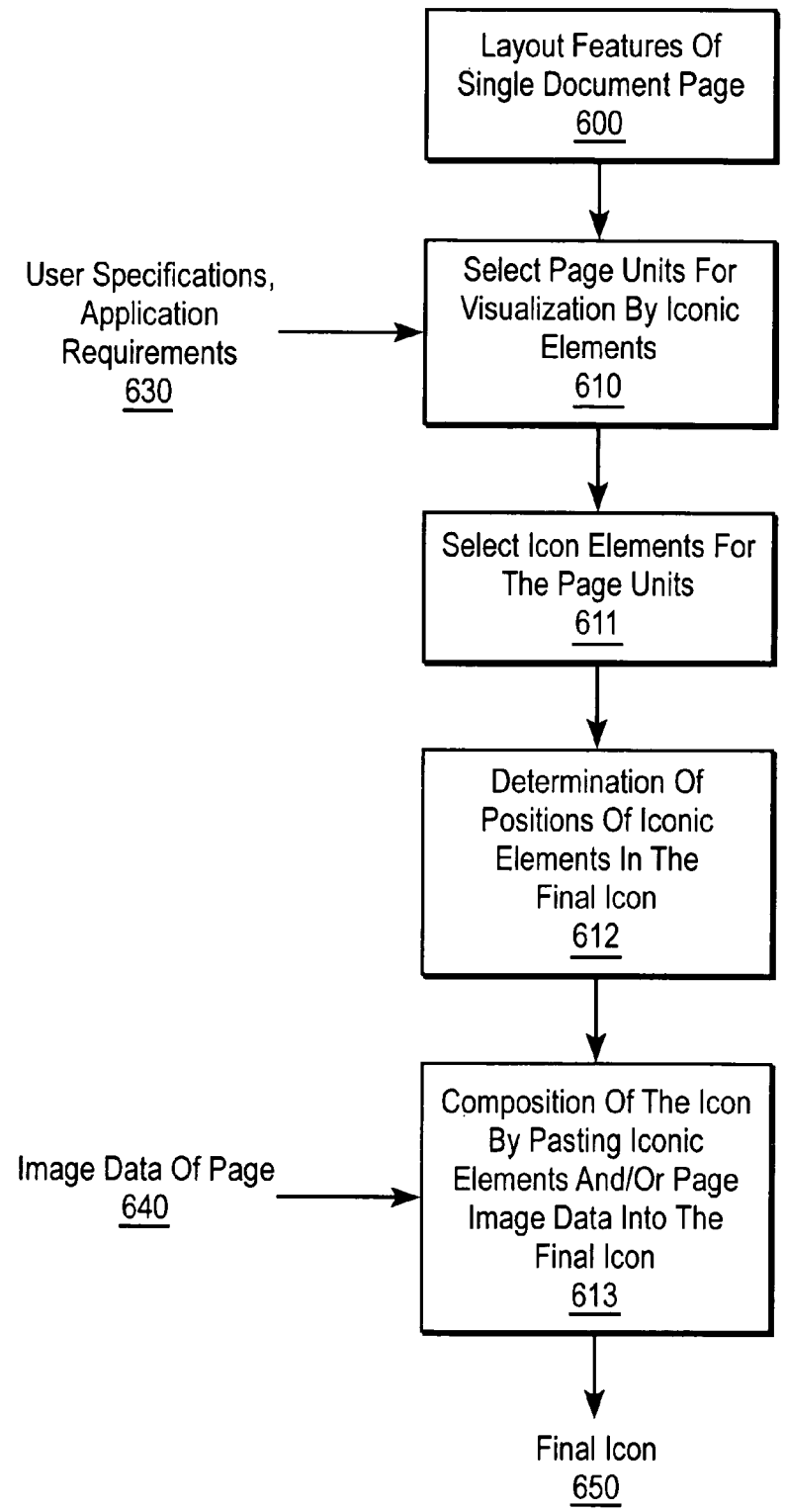
FIG. 6C is a flow diagram of one embodiment of a process for creation of a single-document icon.

FIG. 6C shows a block diagram with the steps necessary for creation of a single-document icon. The processing is performed by processing language that may comprise hardware (e.g., circuitry, dedicated logic, etc.), software (such as is run on a general purpose computer system or a dedicated machine), or a combination of both.

Referring to FIG. 6C, the processing begins by processing logic selecting page units for visualization by iconic elements (processing block 610). This is in response to layout features 600 of a single document page. In one embodiment, this is based on user specifications and/or application requirements 630.

Processing logic selects icon elements from the selected page units (processing block 611). Next, processing logic determines the position of iconic elements in a final icon (processing block 612). Then, based on image data 640 of the page, processing logic composes the final icon 650 by pasting iconic elements and/or page image data into the final icon (processing block 613).

In this case of a single-document icon, clustering and tree pruning do not have to be performed. The dimensions of the icon depend on the content of the page. User preferences or application requirements may determine the set of iconic elements included in the icon.

Exemplary Applications

Figure 11:
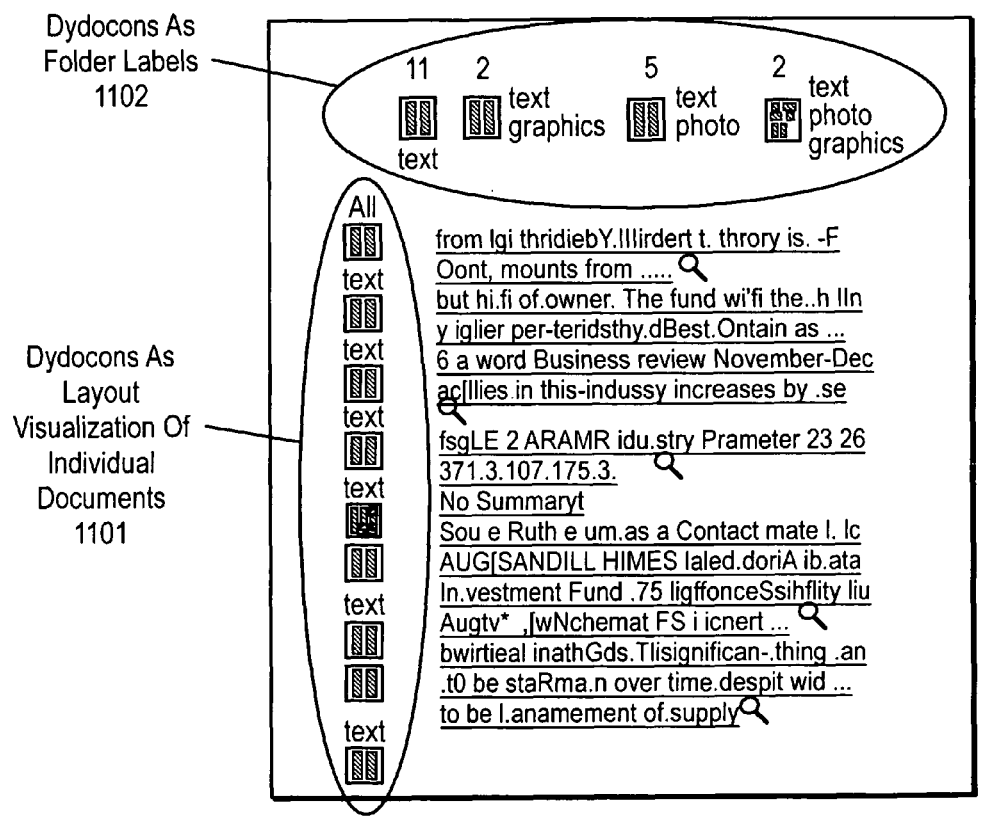
FIG. 11 shows such an example of retrieval results displayed on a PDA-like display.

One possible use of dynamic document icons is to add them to the text results in order to visualize individual page layout information and/or display them as a cluster labels or "folder symbols." FIG. 11 shows such an example of retrieval results displayed on a PDA-like display using dynamic document icons 1101 to the left and dynamic document icons 1102 to the top as follows.

Starting from dynamic document icons as folder symbols a possible usage scenario is to add a linkage structure to the folder symbols such that clicking on them creates a new view showing retrieval results for those documents that are contained in the chosen dynamic document icon cluster. When documents contain image zones, dynamic document icons show low resolution versions of the original image content at the appropriate places in the icon. FIG. 7C illustrates the usage as one progress further down the tree away from the root node. Each iconic element at each node on the tree generally shows more material that it is indicative of the document or set of documents represented by true icon.

Other applications of dynamic document icons is for searching and browsing. Herein searching is defined as locating a particular document given some specific information, such as a title. Browsing, in contrary, does not have a well defined goal, but satisfies the need to learn more about the document collection. Using these definitions, dynamic document icons may in general support a browsing task better than a search task.

Figure 14:
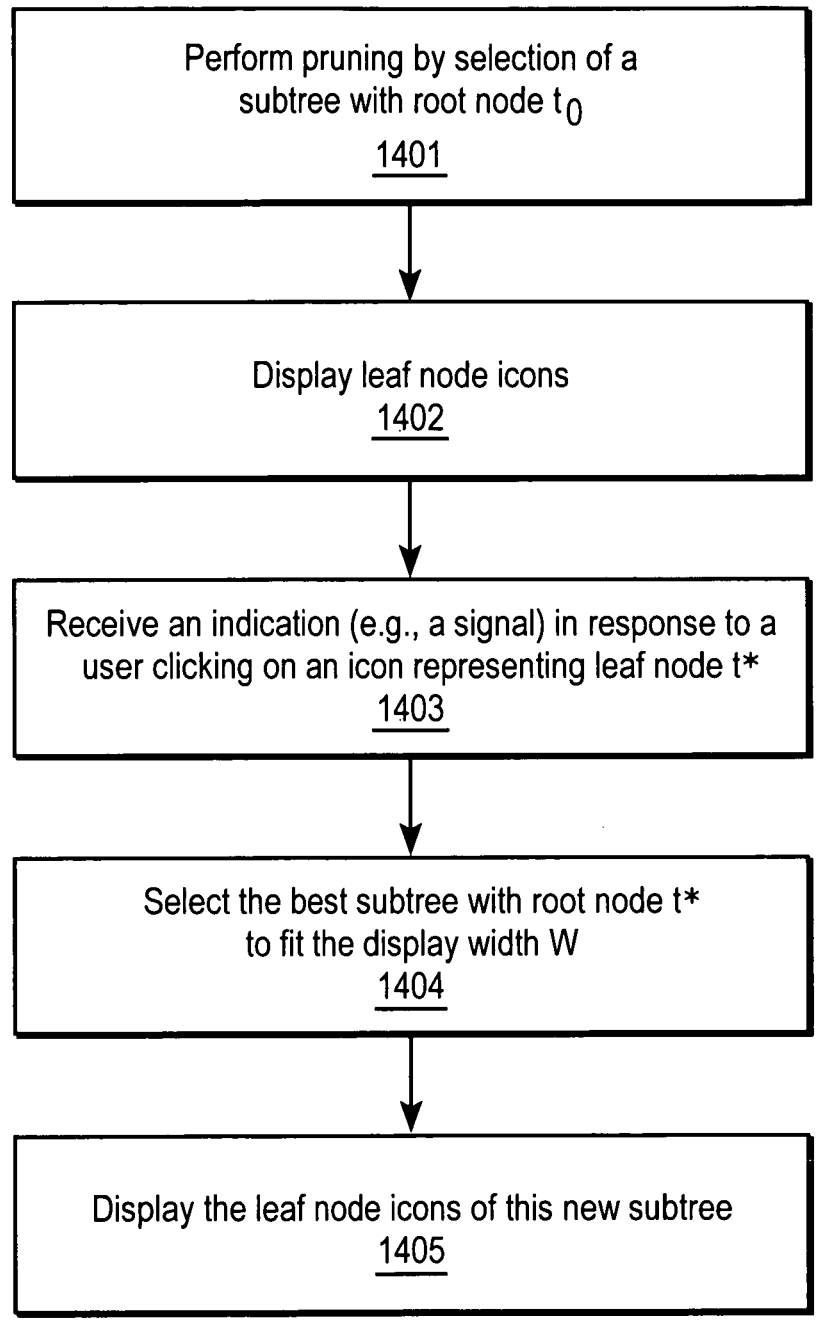
FIG. 14 is a flow diagram of one embodiment of a process for browsing a document collection represented with an icon tree.

More specifically, tree pruning may be used to help a user navigate through an icon tree that represents a document collection. The icon tree includes a root node to. FIG. 14 is a flow diagram of one embodiment of a process for browsing a document collection represented with an icon tree. The process is performed by processing logic that may comprise hardware (circuitry, dedicated logic, etc.), software (such as is run on a general purpose computer system or a dedicated machine), or a combination of both.

Referring to FIG. 14, assuming a display width W, in a first operation processing logic performs pruning by selection of a subtree with root node to (processing block 1401). After the subtree selection/pruning step, processing logic displays leaf node icons (processing block 1402). Then, processing logic receives an indication (e.g., a signal) in response to a user clicking on an icon representing leaf node t* (processing block 1403). In response thereto, processing logic performs another subtree selection process to select the best subtree with root node t* to fit the display width W (processing block 1404) and displays the leaf node icons of this new subtree (processing block 1405).

Algorithmically-Controlled Perceivable Information

The visualization techniques described herein incorporates the content of document collections, as well as geometric properties of visualizations, and links these elements with percievability of results by the user and constraints given by display devices. The concept is explained in more detail below. In prior art, one way display characteristics, such as screen area, are considered by setting a fixed number for retrieval results on the first page. For example, Google shows 10 results on the first web page. Depending on the size of the browser window, the user may not perceive information on all 10 results, but may have to scroll to receive the information for all 10 results.

Figure 12:
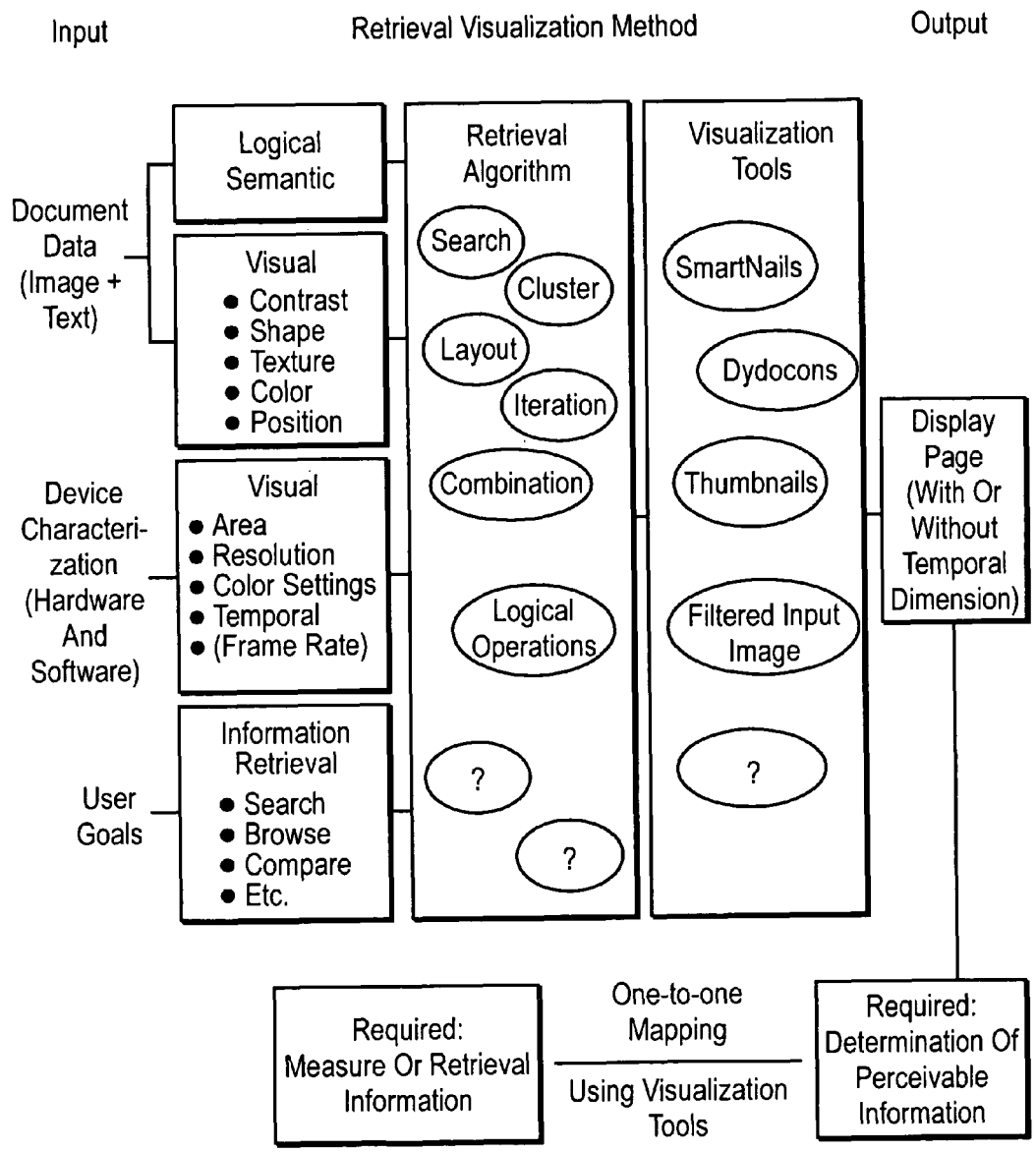
FIG. 12 shows a schematic overview of the separation into input, output, retrieval algorithms and visualization tools including the mapping between algorithmically measured retrieval and perceivable information.

Given the input parameters and the image as an output media the goal of a retrieval visualization algorithm needs to be to compute and visualize retrieval data and make sure that the user can perceive the information contained in those data. To achieve this goal, information is determined or measured in various ways. On the one hand, information needs to be measured inside of algorithms used for tasks like searching, clustering, creating layouts, etc. This information is called algorithmically measured retrieval information. On the other hand, the information that is perceived by the user through the final visualization image needs to be determined. This information is called perceivable information (examples may include readability recognizability, differentialability). In order to map algorithmically measured retrieval information to perceivable information, visualization tools like Smart-Nails (see U.S. patent application Ser. No. 10/435,300, entitled "Resolution Sensitive Layout of Document Regions," filed May 9, 2003, published Jul. 29, 2004 (Publication No. 20040145593)) and dynamic document icons are used. They are called visualization tools. A schematic overview of the separation into input, output, retrieval algorithms and visualization tools including the mapping between algorithmically measured retrieval and perceivable information is shown in FIG. 12.

At a technical level the division into algorithmically measured retrieval and perceivable information leads to the central question of how to determine and measure perceivable information in visualizations of document retrieval results (especially challenging is the example of measuring information about collections of documents). Once there is a measure for this information a mapping between perceivable and algorithmically extracted retrieval information needs to be defined. This would allow the algorithmic control of perceivable information. Therefore, the concept illustrated in FIG. 12 is called Algorithmically-Controlled Perceivable Information.

Traditional visualizations such as traditional thumbnails or dendrograms fit into the concept as cases in which the mapping between the retrieval information and perceivable information has not been established or controlled, and the display characteristics are missing as an input.

An Exemplary Computer System

Figure 13:
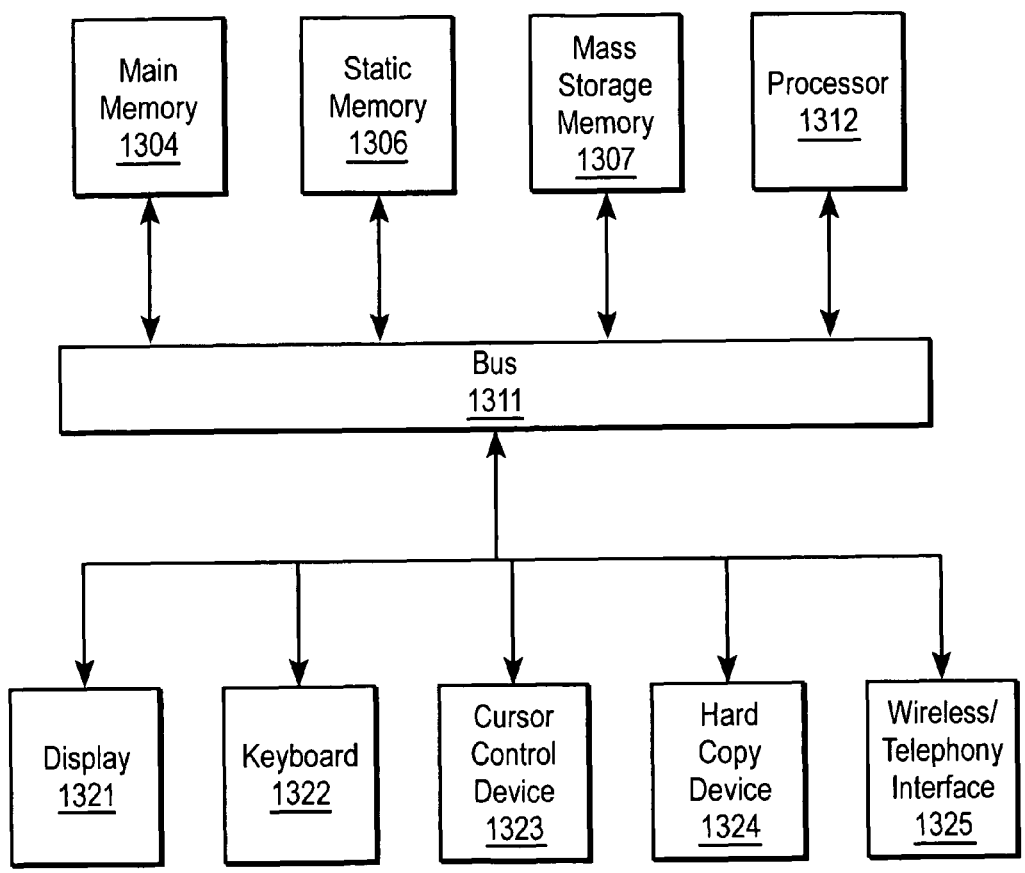
FIG. 13 is a block diagram of an exemplary computer system that may perform one or more of the operations described herein.

FIG. 13 is a block diagram of an exemplary computer system that may perform one or more of the operations described herein. Referring to FIG. 13, computer system 1300 may comprise an exemplary client or server computer system. Computer system 1300 comprises a communication mechanism or bus 1311 for communicating information, and a processor 1312 coupled with bus 1311 for processing information. Processor 1312 includes a microprocessor, but is not limited to a microprocessor, such as, for example, Pentium™, PowerPC™, Alpha™, etc.

System 1300 further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

Computer system 1300 also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

Computer system 1300 may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for printing instructions, data, or other information on a medium such as paper, film, or similar types of media. Furthermore, a sound recording and playback device, such as a speaker and/or microphone may optionally be coupled to bus 1311 for audio interfacing with computer system 1300. Another device that may be coupled to bus 1311 is a wired/wireless communication capability 1325 to communication to a phone or handheld palm device.

Note that any or all of the components of system 1300 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
representing, by a processor, a group of document images using a plurality of visualizations that visualize document layout information for the group of document images based on one or more display device characteristics and based on content of the group of documents; and
adapting, by the processor, the plurality of visualizations to an available display by removing one or more visualizations from the plurality of visualizations based on at least two functional values, wherein the plurality of visualizations are adapted to the available display utilizing a layout function to minimize a dissimilarity of each of the plurality of visualizations that fit into the available display, wherein the plurality of visualizations comprises an iconic tree representation of layout features of a document collection, wherein each icon in the iconic tree representation includes a first part that represents a geometric feature of a layout element and a second part that represents a content type of the layout element, and wherein adapting the plurality of visualizations comprises adapting the iconic tree representation by pruning one or more icon subtrees with a non-greedy selection that is based on a ratio determined from a plurality of tree functional values to create a pruned tree, wherein the plurality of tree functional values utilized by the non-greedy selection include, for each subtree, at least a real-valued distortion function value computed from a subtree considered with a real-valued resource function value computed for a width of an iconic representation of the subtree, and wherein the ratio utilized by the non-greedy selection is a ratio of a real-valued resource function value versus a real-valued distortion function value for a subtree.

2. The method defined in claim 1 wherein removing the one or more visualizations comprises reducing clusters of document images.

3. The method defined in claim 1 wherein the plurality of visualizations comprises an iconic representation of discriminative visualizable features of document layout as a collection of iconic visual elements.

4. The method defined in claim 1 where each visualization represents a group of document images.

5. The method defined in claim 1 wherein the functional values measure geometric properties of the visualization and are characteristic of layout features of documents in the group.

6. The method defined in claim 1 wherein adapting the plurality of visualizations to an available display width comprises evaluating a plurality of subtrees by at least two tree functionals and selecting a subtree that has a preselected ratio among the tree functional values subject to a size constraint on subtree visualization.

7. The method defined in claim 6 wherein the preselected ratio of tree functional values comprises a smallest ratio of distortion versus the required visualization area of all subtrees with a specified root node.

8. The method defined in claim 6 wherein adapting the plurality of visualizations to an available display width comprises, for each subtree, measuring layout dissimilarity in the documents in the leaf modes and size of iconic representation using tree functionals.

9. The method defined in claim 1 wherein adapting the plurality of visualizations to an available display width comprises removing icon trees via a subtree selection based on tree functionals.

10. The method defined in claim 1 wherein tree functional selection is performed in a manner that assumes monotonicity and linearity of functionals.

11. The method defined in claim 1 wherein the functional values comprise dissimilarity of elements of a cluster and visualization width.

12. The method defined in claim 1 wherein adapting the plurality of visualizations to an available display width comprises applying a generalized Breiman, Friedman, Olshen, and Stone (BFOS) algorithm to tree functional values to evaluation distortion of node clusters versus the size of the iconic visualization subject to a constraint on the total size of leave node icons.

13. A non-transitory computer readable medium storing instructions thereon which, when executed by a system, cause the system to perform a method comprising:
representing a group of document images using a plurality of visualizations that visualize document layout information for the group of document images based on one or more display device characteristics and based on content of the group of documents; and
adapting the plurality of visualizations to an available display width by removing one or more visualizations from the plurality of visualizations based on at least two functional values, wherein the plurality of visualizations are adapted to the available display utilizing a layout function to minimize a dissimilarity of each of the plurality of visualizations that fit into the available display, wherein the plurality of visualizations comprises an iconic tree representation of layout features of a document collection, wherein each icon in the iconic tree representation includes a first part that represents a geometric feature of a layout element and a second part that represents a content type of the layout element, and wherein adapting the plurality of visualizations comprises adapting the iconic tree representation by pruning one or more icon subtrees with a non-greedy selection that is based on a ratio determined from a plurality of tree functional values to create a pruned tree, wherein the plurality of tree functional values utilized by the non-greedy selection include, for each subtree, at least a real-valued distortion function value computed from a subtree considered with a real-valued resource function value computed for a width of an iconic representation of the subtree, and wherein the ratio utilized by the non-greedy selection is a ratio of a real-valued resource function value versus a real-valued distortion function value for a subtree.

14. The non-transitory computer readable medium defined in claim 13 wherein adapting the plurality of visualizations to an available display width comprises evaluating a plurality of subtrees by at least two tree functionals and selecting a subtree that has a preselected ratio among the tree functional values subject to a size constraint on subtree visualization.

15. The non-transitory computer readable medium defined in claim 14 wherein the preselected ratio of tree functional values comprises a smallest ratio of distortion versus the required visualization area of all subtrees with a specified root node.

16. The non-transitory computer readable medium defined in claim 14 wherein adapting the plurality of visualizations to an available display width comprises, for each subtree, measuring layout dissimilarity in the documents in a node and size of iconic representation using tree functionals.

17. The non-transitory computer readable medium defined in claim 13 wherein adapting the plurality of visualizations to an available display width comprises removing icon trees via a subtree selection based on tree functionals.

18. The non-transitory computer readable medium defined in claim 17 wherein subtree selection is performed in a manner that assumes monotonicity and sub-linearity of functionals.

19. The non-transitory computer readable medium defined in claim 13 wherein the functional values comprise dissimilarity of elements of a cluster and combined icon width.

20. The non-transitory computer readable medium defined in claim 13 wherein adapting the plurality of visualizations to an available display width comprises applying a generalized Breiman, Friedman, Olshen, and Stone (BFOS) algorithm to tree functional values to evaluation distortion of node clusters versus the size of the iconic visualization subject to a constraint on the total size of leave node icons.

21. An apparatus comprising:
means for representing a group of document images using a plurality of visualizations that visualize document layout information for the group of document images based on one or more display device characteristics and based on content of the group of documents; and
means for adapting the plurality of visualizations to an available display width by removing one or more visualizations from the plurality of visualizations based on at least two functional values, wherein the plurality of visualizations are adapted to the available display utilizing a layout function to minimize a dissimilarity of each of the plurality of visualizations that fit into the available display, wherein the plurality of visualizations comprises an iconic tree representation of layout features of a document collection, wherein each icon in the iconic tree representation includes a first part that represents a geometric feature of a layout element and a second part that represents a content type of the layout element, and wherein adapting the plurality of visualizations comprises means for adapting the iconic tree representation by pruning one or more icon subtrees with a non-greedy selection that is based on a ratio determined from a plurality of tree functional values to create a pruned tree, wherein the plurality of tree functional values utilized by the non-greedy selection include, for each subtree, at least a real-valued distortion function value computed from a subtree considered with a real-valued resource function value computed for a width of an iconic representation of the subtree, and wherein the ratio utilized by the non-greedy selection is a ratio of a real-valued resource function value versus a real-valued distortion function value for a subtree.

22. An apparatus comprising:
a memory; and
a processor coupled with the memory to execute
an icon-creation unit to create an iconic representation of discriminative visualizable features of document layout as a collection of iconic visual elements, wherein the collection of iconic visual elements comprises an iconic tree representation of layout features of a document collection, and wherein each icon in the iconic tree representation includes a first part that represents a geometric feature of a layout element and a second part that represents a content type of the layout element, and
a tree-pruning unit to reduce one or more clusters with a non-greedy selection that is based on a ratio determined from at least two tree functionals and a layout function to minimize a dissimilarity between icons in clusters that fit into an available display based on constraints of the display device to display the icons at leaf nodes of a pruned tree, and wherein the one or more clusters are reduced by pruning one or more icon subtrees based on the at least two tree functional values to create a pruned tree, wherein the plurality of tree functional values utilized by the non-greedy selection include, for each subtree, at least a real-valued distortion function value computed from a subtree considered with a real-valued resource function value computed for a width of an iconic representation of the subtree, and wherein the ratio utilized by the non-greedy selection is a ratio of a real-valued resource function value versus a real-valued distortion function value for a subtree.

23. A method comprising:
representing, by a processor, a document collection in a size-constrained display using an iconic tree representation of discriminative visualizable features of document layout as a collection of iconic visual elements based on a layout function to fit the iconic tree representation into an available display based on constraints of the display while minimizing a dissimilarity between iconic visual elements in the iconic tree representation, wherein the iconic tree representation is adapted to the available display by pruning one or more icon subtrees with a non-greedy selection that is based on a ratio determined from a plurality of tree functional values to create a pruned tree, wherein the plurality of tree functional values utilized by the non-greedy selection include, for each subtree, at least a real-valued distortion function value computed from a subtree considered with a real-valued resource function value computed for a width of an iconic representation of the subtree, and wherein the ratio utilized by the non-greedy selection is a ratio of a real-valued resource function value versus a real-valued distortion function value for a subtree; and navigating, by the processor, through the document collection by performing successive subtree selection.

24. The method defined in claim 23 wherein navigating through the document collection comprises:

identifying the next best subtree from existing subtrees in the iconic tree representation; and displaying the next best subtree in the size-constrained display.

* * * * *